(12) United States Patent
Miyagaki et al.

(10) Patent No.: US 7,363,439 B2
(45) Date of Patent: Apr. 22, 2008

(54) CONTROL DEVICE CONNECTED TO EXTERNAL DEVICE

(75) Inventors: Atsushi Miyagaki, Odawara (JP); Dai Taninaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 11/005,025

(22) Filed: Dec. 7, 2004

(65) Prior Publication Data

US 2006/0085572 A1 Apr. 20, 2006

(30) Foreign Application Priority Data

Oct. 15, 2004 (JP) ............................. 2004-300871

(51) Int. Cl.
G06F 3/00 (2006.01)
G06F 3/06 (2006.01)
G06F 12/00 (2006.01)
G06F 13/00 (2006.01)
G06F 13/28 (2006.01)

(52) U.S. Cl. ..................... 711/154; 711/4; 711/112; 710/2; 710/8; 710/15

(58) Field of Classification Search ................ 711/154, 711/100, 54, 4, 5; 709/225
See application file for complete search history.

(56) References Cited

U.S. PATENT DOCUMENTS

| | | | | |
|---|---|---|---|---|
| 5,325,505 A | * | 6/1994 | Hoffecker et al. | 707/101 |
| 6,202,124 B1 | * | 3/2001 | Kern et al. | 711/112 |
| 6,457,069 B1 | * | 9/2002 | Stanley | 711/100 |
| 6,625,691 B2 | * | 9/2003 | Obara et al. | 711/114 |
| 6,711,574 B1 | * | 3/2004 | Todd et al. | 707/100 |
| 6,757,792 B2 | * | 6/2004 | Morishita et al. | 711/154 |
| 6,907,500 B2 | * | 6/2005 | Suzuki et al. | 711/114 |
| 6,950,914 B2 | * | 9/2005 | Iwami et al. | 711/154 |
| 2003/0023784 A1 | * | 1/2003 | Matsunami et al. | 710/36 |
| 2003/0154281 A1 | | 8/2003 | Mitsuoka et al. | |
| 2003/0191910 A1 | * | 10/2003 | Matsunami et al. | 711/154 |
| 2003/0204701 A1 | * | 10/2003 | Mimatsu et al. | 711/203 |
| 2004/0111485 A1 | * | 6/2004 | Mimatsu et al. | 709/213 |
| 2005/0144404 A1 | * | 6/2005 | Nashimoto et al. | 711/154 |

FOREIGN PATENT DOCUMENTS

| | | |
|---|---|---|
| EP | 1357476 | 10/2003 |
| EP | 1400893 | 3/2004 |
| JP | 09-288547 | 11/1997 |
| JP | 10-508967 | 9/1998 |
| JP | 2001-337850 | 12/2001 |
| WO | WO 97/09676 | 3/1997 |

* cited by examiner

*Primary Examiner*—Donald Sparks
*Assistant Examiner*—Fred W Detschel
(74) *Attorney, Agent, or Firm*—Antonelli, Terry, Stout & Kraus, LLP.

(57) ABSTRACT

The control device is a device which can be connected to an external device that transmits data, comprising a computer program which analyzes data received from the abovementioned external device using data format information related to the format of the data, wherein the abovementioned data format information is stored in a separate location from said computer program.

10 Claims, 16 Drawing Sheets

FIG. 7A

|   | 1 | 2 | 3 | 4 | 5 | 6 | 7 | 8 |
|---|---|---|---|---|---|---|---|---|
| A | A | A | B |   |   |   |   |   |
| B |   |   |   |   |   |   |   |   |
| C |   |   |   | L | D | E | V | 1 |
| D |   |   |   |   |   |   |   |   |
| E |   |   | M | A | P |   |   |   |
| F |   |   |   |   |   |   |   |   |

| MODEL IDENTIFICATION INFORMATION | REFERENCE POSITION | A1~A3 |
|---|---|---|
|  | CONTENT | AAA |
| EXTERNAL LDEV IDENTIFICATION POSITION INFORMATION | | C4~C8 |
| EXTERNAL LDEV SETTING POSITION INFORMATION | | E3~E5 |
| SUPPORTED-FUNCTION INFORMATION | | COPY FUNCTION SUPPORTED |

| MODEL IDENTIFICATION INFORMATION | REFERENCE POSITOIN | A1~A3 |
|---|---|---|
|  | CONTENT | AAB |
| EXTERNAL LDEV IDENTIFICATION POSITION INFORMATION | | C4~C8 |
| EXTERNAL LDEV SETTING POSITION INFORMATION | | E3~E5 |
| SUPPORTED-FUNCTION INFORMATION | | COPY FUNCTION SUPPORT |

| INDIVIDUAL SUPPORT DEVICE INFORMATION NUMBER | 2 |
|---|---|
| EXTERNAL LDEV IDENTIFICATION INFORMATION | LDEV1 |
| ATTRIBUTE INFORMATION | COPY FUNCTION SUPPORTED |
| FIRST PORT ID | 1 |
| SECOND PORT ID | 3 |
| LUN | 2 |
| PATH STATUS | NORMAL |
| EXTERNAL LDEV SETTING INFORMATION | MAP |
| PATH PRIORITY | 1 |

13

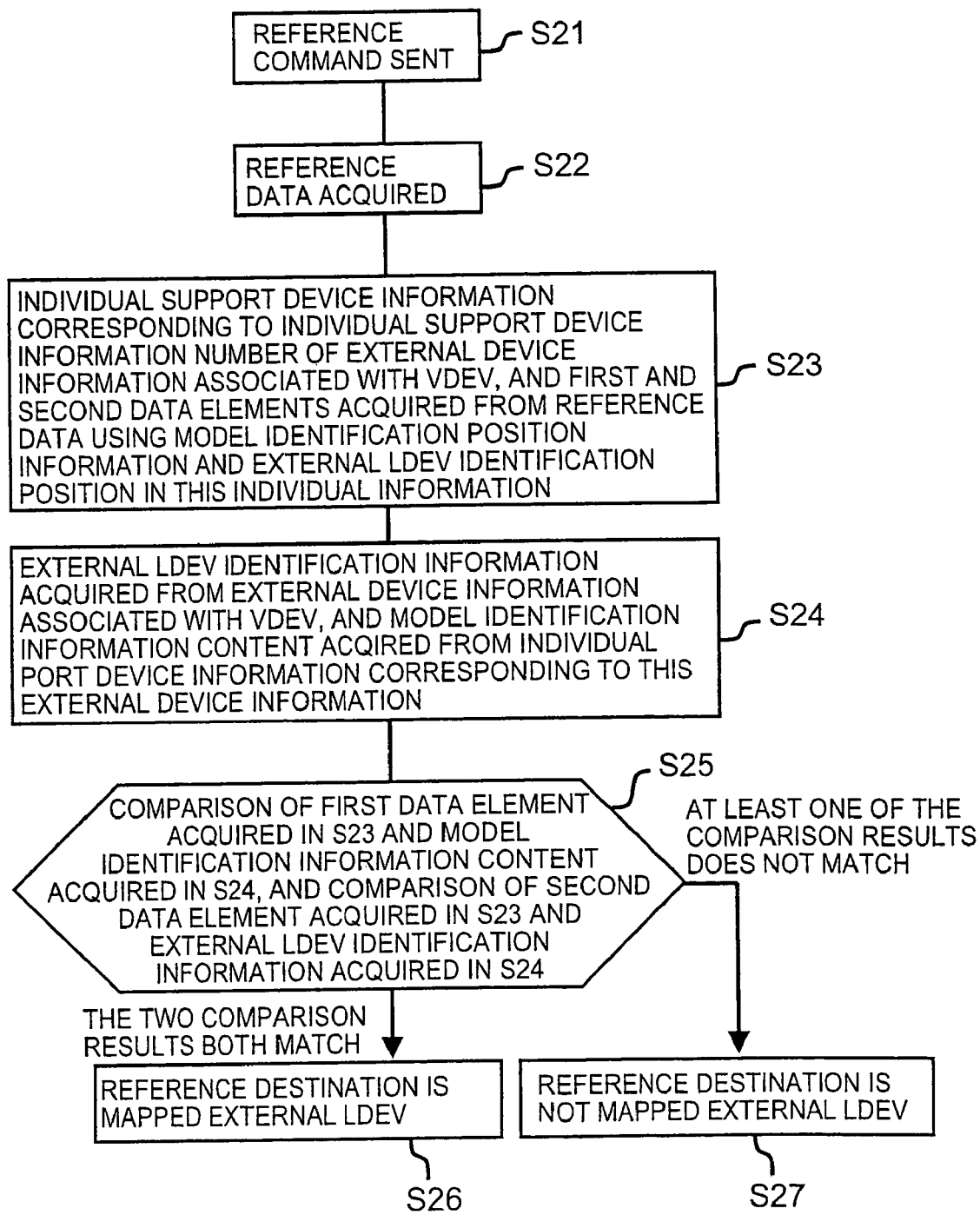

FIG. 10A

| TRIAL | NO. | VENDOR NAME | DEVICE NAME | NORMAL I/O SUPPORT | CROSS COPY |
|---|---|---|---|---|---|
| | 1 | H | AAA | ● | ● |
| | 2 | D | BBB | ● | ● |
| | 3 | H | CCC | ● | ● |
| | | | | | |
| | | | | | |

[OPEN FILE] [SAVE FILE] [ADD TRIAL DEVICE] [INQUIRY]
[APPLY] [CANCEL]

FIG. 10B

■ SUPPORT DEVICE INFORMATION

| TRIAL | NO. | VENDOR NAME | DEVICE NAME | NORMAL I/O SUPPORT | CROSS COPY |
|---|---|---|---|---|---|
| | 1 | H | AAA | ● | ● |
| | 2 | D | BBB | ● | ● |
| | 3 | H | CCC | ● [DETAIL] | ● |
| | | | | | |

[OPEN FILE] [SAVE FILE] [ADD TRIAL DEVICE] [INQUIRY]
[APPLY] [CANCEL]

FIG. 10C

■ DETAIL INFORMATION

NO.3 ☐

VENDOR NAME
- PAGE NUMBER
- HEAD BYTE POSITION
- BYTE LENGTH
- DATA CONTENT
- DISPLAY NAME

[OTHER SETTING INFORMATION]

[NEXT] [PREVIOUS] [OK] [CANSEL]

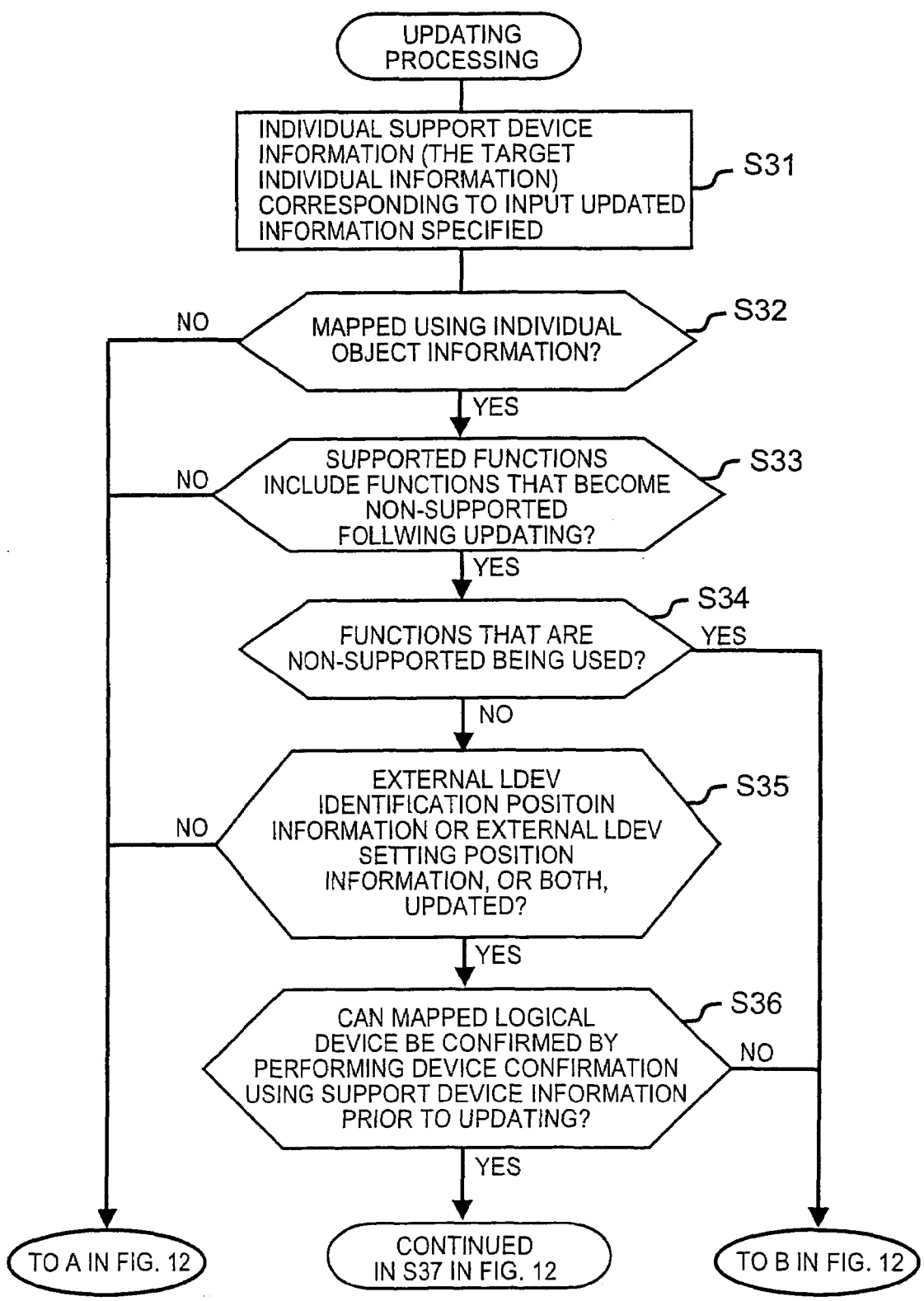

FIG. 14A

|   | 1 | 2 | 3 | 4 | 5 | 6 | 7 | 8 |
|---|---|---|---|---|---|---|---|---|
| A | A | A | B |   |   |   |   |   |
| B |   |   |   |   |   |   |   |   |
| C |   |   |   | L | D | E | V | 1 |
| D | D | E | V | 1 |   |   |   |   |
| E |   |   | M | A | P |   |   |   |
| F |   |   |   |   |   |   |   |   |

| MODEL IDENTIFICATION INFORMATION | REFERENCE POSITION | A1~A3 |
|---|---|---|
|  | CONTENT | AAB |
| EXTERNAL LDEV IDENTIFICATION POSITION INFORMATION | | D4~D8 |
| EXTERNAL LDEV SETTING POSITION INFORMATION | | E3~E5 |
| SUPPORTED-FUNCTION INFORMATION | | COPY FUNCTION SUPPORTED |

| INDIVIDUAL SUPPORT DEVICE INFORMATION NUMBER | 2 |
|---|---|
| EXTERNAL LDEV IDENTIFICATION INFORMATION | LDEV1 |
| ATTRIBUTE INFORMATION | COPY FUNCTION SUPPORTED |
| FIRST PORT ID | 1 |
| SECOND PORT ID | 3 |
| LUN | 2 |
| PATH STATUS | NORMAL |
| EXTERNAL LDEV SETTING INFORMATION | MAP |
| PATH PRIORITY | 1 |

|   | 1 | 2 | 3 | 4 | 5 | 6 | 7 | 8 |
|---|---|---|---|---|---|---|---|---|
| A | A | A | B |   |   |   |   |   |
| B |   |   |   | L | D | E | V | 1 |
| C |   |   |   |   |   |   |   |   |
| D | E | E | E | E | D | E | V | 1 |
| E |   |   | M | A | P |   |   |   |
| F |   |   |   |   |   |   |   |   |

FIG. 15B

| MODEL IDENTIFICATION INFORMATION | REFERENCE POSITION | A1~A3 |
|---|---|---|
| | CONTENT | AAB |
| FIRST EXTERNAL LDEV IDENTIFICATION POSITION INFORMATION | | C4~C8 |
| SECOND EXTERNAL LDEV IDENTIFICATION POSITION INFORMATION | | D1~D8 |
| EXTERNAL LDEV SETTING POSITION INFORMATION | | E3~E5 |
| SUPPORTED-FUNCTION INFORMATION | | COPY FUNCTION SUPPORTED |

FIG. 15C

| INDIVIDUAL SUPPORT DEVICE INFORMATION NUMBER | 2 |
|---|---|
| FIRST EXTERNAL LDEV IDENTIFICATION INFORMATION | LDEV1 |
| SECOND EXTERNAL LDEV IDENTIFICATION INFORMATION | EEEEDEV1 |
| ATTRIBUTE INFORMATION | COPY FUNCTION SUPPORTED |
| FIRST PORT ID | 1 |
| SECOND PORT ID | 3 |
| LUN | 2 |
| PATH STATUS | NORMAL |
| EXTERNAL LDEV SETTING INFORMATION | MAP |
| PATH PRIORITY | 1 |

FIG. 16A
|   | 1 | 2 | 3 | 4 | 5 | 6 | 7 | 8 |
|---|---|---|---|---|---|---|---|---|
| A | A | A | B |   |   |   |   |   |
| B |   |   |   |   |   |   |   |   |
| C |   |   |   | 0 | 0 | 0 | 0 | 0 |
| D | D | E | V | 1 |   |   |   |   |
| E |   |   | M | A | P |   |   |   |
| F |   |   |   |   |   |   |   |   |
I4
FIG. 16B
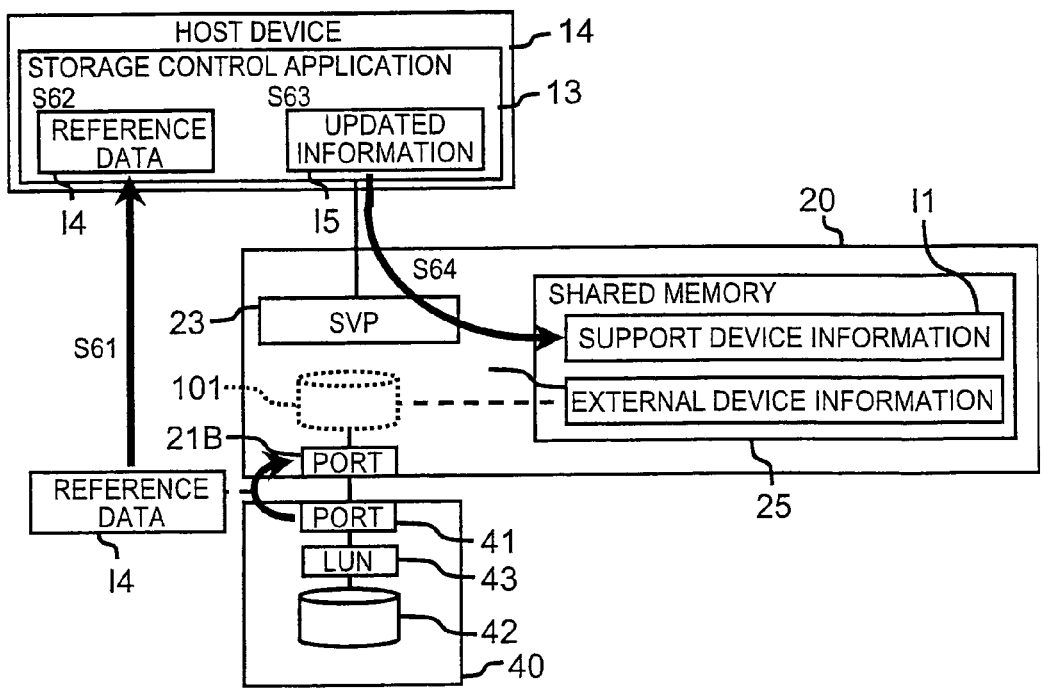
FIG. 16C
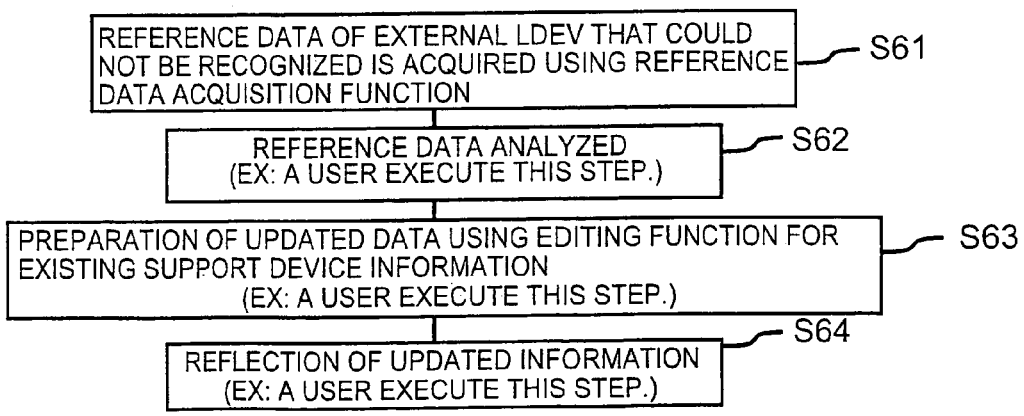

CONTROL DEVICE CONNECTED TO EXTERNAL DEVICE

CROSS-REFERENCE TO PRIOR APPLICATION

This application relates to and claims priority from Japanese Patent Application No. 2004-300871 filed on Oct. 15, 2004, the entire disclosure of which is incorporated herein by reference.

1. Field of the Invention

The present invention relates to a control device which is connected to an external device; for example, the invention relates to a control device which is connected to a memory control device comprising a storage device.

2. Description of the Related Art

For example, in data base systems that handle large-scale data such as data centers and the like, data is controlled using a memory system that is constructed separately from the host computer. For instance, such memory systems are constructed from disk array devices or the like. Disk array devices are constructed by disposing numerous storage devices in the form of an array; for example, such devices are constructed on the basis of an RAID (redundant array of independent inexpensive disks). One or more logical volumes (logical units) are formed in physical memory regions provided by the storage devices, and these logical volumes are provided to the host computer (more specifically, to a data base program that is operated by the host computer). The host computer writes data into the logical volumes and reads data from the logical volumes by transmitting specified commands.

With the development of an informationized society and the like, there has been a continuing increase in the amount of data that must be managed by data bases. As a result, there is a demand for memory control devices that have a higher performance and larger capacity. New types of memory control devices have been developed in order to meet this market demand. Two types of methods are conceivable as methods for introducing new types of memory control devices into memory systems. One of these methods is a method in which the old type memory control device and new type memory control device are completely switched, so that the memory system is constructed completely from the new type storage device (Japanese Patent Publication No. 10-508967). The other method is a method in which the new type memory control device is newly added to a memory system consisting of the old type storage device, so that the new type memory control device is caused to be present along with the old type memory control device.

Furthermore, a technique is also known in which the memory regions of physical devices are controlled in sector units, so that logical devices a dynamically constructed in sector units (Japanese Patent Application Laid-Open No. 2001-337850).

Moreover, a technique is also known which is devised so that when logical devices are constructed from a plurality of storage devices with different capacities, an area is formed in accordance with the storage device that has the smallest capacity, and an area is formed in accordance with the smallest capacity in the case of the remaining capacities as well (Japanese Patent Application Laid-Open No. 9-288547).

SUMMARY OF THE INVENTION

For example, data that is sent to a first memory control device from a second memory control device is interpreted by a computer control program (hereafter referred to as a control program) that is present in the first memory control device. In this case, the control program is constructed so as to be able to interpret a specified data format.

However, there may be cases in which the format of the data received by the first memory control device is a new data format that cannot be interpreted by the control program, for reasons such as the connection of a new second memory control device to the first memory control device, upgrading of the version of the computer program in the second memory control device or the like. In such cases, the control program of the first memory control device must be updated to a new control program that can interpret the new data format. Ordinarily, however, updating of the control program cannot be performed during the operation of the control program (for example, this updating cannot be performed while the control program is processing I/O requests (e.g., data write commands or read commands) from the host computer). Consequently, the operation of the control program must be stopped in order to arrange the system so that the first memory control device can interpret the new data format.

Accordingly, it is an object of the present invention to make it possible to arrange a control device so that this control device can interpret a data format that could not previously be interpreted, without stopping the operation of the computer program of this control device.

Other objects of the present invention will become clear from the following description.

The control device according to one aspect of the present invention can be connected to a host computer which outputs access destination data indicating an access destination selected from a plurality of access destinations, and an external storage control device which has one or more external storage devices and transmits external data constituting data that relates to the external storage devices. This control device comprises a memory part that stores external device information indicating which external storage device corresponds to which access destination data, and a control part which receives access destination data from the abovementioned host computer, specifies the external storage device corresponding to the abovementioned received access destination data by referring to the abovementioned external device information, and accesses the abovementioned specified external storage device. The abovementioned control part comprises a computer program which refers to data format information relating to the format of the abovementioned external constituent data, and interprets the abovementioned external data that is received from the abovementioned external storage control device, and the abovementioned memory part stores the abovementioned data format information that is referred to by the abovementioned computer program.

Here, any type of data such as numbers, symbols, logical block addresses or the like may be used as the "access destination data", as long as this data is information that indicates the access destination.

Furthermore, for example, the "external storage device" may be either a physical storage device or a logical storage device. Moreover, for example, the "external storage control device" may be a hard disk drive comprising a hard disk, or may be a disk array device comprising a plurality of physical storage devices.

Furthermore, the "control part" may be a microprocessor, a circuit board comprising a microprocessor, or the like.

Furthermore, the "memory part" may be either a logical resource or a physical resource. In the latter case, for example, the memory part may be either a memory or a hard disk.

Furthermore, the "control device" may be either a personal computer or a memory control device that is similar to the external storage control device. Moreover, in the latter case, the control device need not necessarily comprise a storage device.

In a first embodiment of this control device, the abovementioned data format information includes a plurality of sets of individual data format information. Each of the abovementioned plurality of sets of individual data format information includes information elements indicating the device attributes of the external storage control device to which the information corresponds.

A second embodiment of this control device is the abovementioned first embodiment wherein the abovementioned computer program retrieves the set of individual data format information that corresponds to the device attributes of the external storage control device that transmitted the abovementioned external data (among the abovementioned plurality of sets of individual data format information), and produces the abovementioned external device information using the abovementioned set of individual data format information that is found, and the abovementioned external data that is received.

A third embodiment of this control device is the abovementioned second embodiment wherein the abovementioned computer program retrieves the set of individual data format information that corresponds to the device attributes of the external storage control device that transmitted the abovementioned external data (among the abovementioned plurality of sets of individual data format information), and judges the appropriateness of the external storage device indicated by the abovementioned external device information using the abovementioned set of individual data format information that is found in this retrieval, external device information that is prepared using the abovementioned set of individual data format information that is found, and the abovementioned external data that is received.

A fourth embodiment of this control device is the abovementioned second embodiment wherein device attribute identification information that is used to identify the device attributes of the abovementioned external storage control device, and external storage device identification information that is used to identify the abovementioned external storage device, are included in the abovementioned external data. Each of the abovementioned plurality of sets of individual data format information includes device attribute identification information that indicates the device attributes corresponding to this set of individual data format information, attribute identification position information that indicates where the abovementioned device attribute identification information is located in the abovementioned external data, and device identification position information that indicates where the abovementioned external storage device identification information is located in the abovementioned external data. The abovementioned computer program acquires device attribute identification information from the external data position indicated by the abovementioned attribute identification position information in a certain set of individual data format information, retrieves an set of individual data format information that produces affirmative judgment results by judging whether or not the abovementioned acquired device attribute identification information and the device attribute identification information in the abovementioned certain set of individual data formation information match each other, acquires external storage device identification information from the external data position indicated by the device identification position information in the abovementioned set of individual data format information that is found in this retrieval, and produces the abovementioned external device information that contains the abovementioned acquired external storage device identification information.

A fifth embodiment of this control device is the abovementioned first embodiment wherein the abovementioned computer program inputs updated information that expresses all or part of the content of a certain set of individual data format information following updating, judges whether or not the abovementioned input updated information is reflected in the set of individual data format information that corresponds to this updated information, reflects the abovementioned updated information in cases where it is recognized that specified conditions are met, and does not reflect the abovementioned updated information in cases where it is not recognized that the abovementioned specified conditions are met.

A sixth embodiment of this control device is the abovementioned fifth embodiment wherein each of the abovementioned sets of individual data format information includes supported-function information that indicates which functions are either supported or not supported by the external storage control device that has device attributes corresponding to this set of individual data format information. In cases where supported-function information indicating that a certain function is not supported is included in the abovementioned input updated information, the abovementioned computer program acts so that the abovementioned updated information is not reflected if the abovementioned control device is using this certain function.

A seventh embodiment of this control device is the abovementioned fifth embodiment wherein the abovementioned external device information is information that is produced using the set of individual data format information corresponding to the device attributes of the external storage control device that transmitted the abovementioned external data, and the abovementioned external data. The abovementioned computer program judges whether or not the abovementioned external storage device is appropriate using the set of individual data format information prior to the reflection of the abovementioned input updated information, and the external data relating to the external storage device corresponding to the abovementioned external device information, and does not reflect the abovementioned input updated information in cases where it is judged that the abovementioned external storage device is not appropriate.

An eighth embodiment of this control device is the abovementioned first embodiment wherein the abovementioned external device information is information that is produced using the set of individual data format information corresponding to the device attributes of the external storage control device that transmitted the abovementioned external data, and the abovementioned external data. Specified types of information elements are included in either the abovementioned external device information or the abovementioned sets of individual data format information, or both, and in the abovementioned external data. The abovementioned computer program judges the appropriateness of the external storage device indicated in the abovementioned external device information using the abovementioned specified types of information elements that are respectively included in either the abovementioned external device information or the abovementioned sets of individual data format information, or both, and in the abovementioned external data. Two or more of the abovementioned specified types of information elements are included in either the abovementioned external device information or the abovementioned sets of individual data format information, or both, and in the abovementioned external data.

A ninth embodiment of this control device is the abovementioned first embodiment wherein the abovementioned external device information is information that is produced using the set of individual data format information corresponding to the device attributes of the external storage control device that transmitted the abovementioned external data, and the abovementioned external data. The abovementioned computer program inputs updated information that expresses all or part of the content of a certain set of individual data format information following updating, reflects the abovementioned input updated information in the set of individual data format information that corresponds to this updated information, and judges whether or not the abovementioned external storage device is appropriate using the set of individual data format information in which the abovementioned updated information is reflected, external device information produced using this set of individual data format information, and external data relating to the external storage device indicated by this external device information. In cases where judgment results indicating that the external storage device is not appropriate are obtained, the abovementioned external device information is produced using the set of individual data format information in which the abovementioned updated information is reflected, and the abovementioned external data.

The control device according to another aspect of the present invention is a device which can be connected to an external storage control device that transmits data, comprising a computer program that analyzes data received from the abovementioned external storage control device using data format information relating to the format of the data, wherein the abovementioned data format information is stored in a separate location from the abovementioned computer program (e.g., a memory region).

BRIEF DESCRIPTION OF THE DRAWINGS

FIG. 1 shows an outline of the device whereby the LDEV 42 of the second memory control device 40 is provided to the host computer 10 as the internal LDEV 32 of the first memory control device 20;

FIG. 7A shows an example of the construction of the reference data that is transmitted by the second memory control device;

FIG. 7B shows one example of the content of individual support device information corresponding to the first device model;

FIG. 7C shows one example of the content of individual support device information corresponding to the second device model;

FIG. 7D shows one example of the content of the external device information that is produced;

FIG. 8 shows one example of the flow of the judgment processing that judges the appropriateness of the external LDEV of the connection destination;

FIGS. 10A through 10C respectively show examples of the GUI screen displayed by the storage control application;

FIG. 11 shows a portion of one example of the flow of the processing that is executed by the first memory control device 20 when updating of the individual support device information is performed;

FIG. 14A shows an example of the construction of the reference data that is acquired in a concrete example of the first example;

FIG. 14B shows an example of the construction of the second individual support device information I2 following updating;

FIG. 14C shows an example of the external device information I3 that is produced using this second individual support device information I2;

FIG. 15 shows examples of construction of the reference data, individual support device information and external device information in a second example (in concrete terms, FIG. 15A shows one example of the reference data following the updating of the reference data shown in FIG. 7A, FIG. 15B shows an example of the construction of the second individual support device information in this second example, and FIG. 15C shows an example of the construction of the external device information corresponding to the second individual support device information shown in FIG. 15B);

FIG. 16A shows one example of the reference data in a third example; and

FIGS. 16B and 16C show examples of the flow of processing up to the return to a state in which the external LDEV can be used following the updating of the second individual support device information in this third example.

DESCRIPTION OF THE PREFERRED EMBODIMENTS

Below, several examples of a first embodiment of the present invention will be described with reference to the attached figures.

EXAMPLE 1

Figure 1:
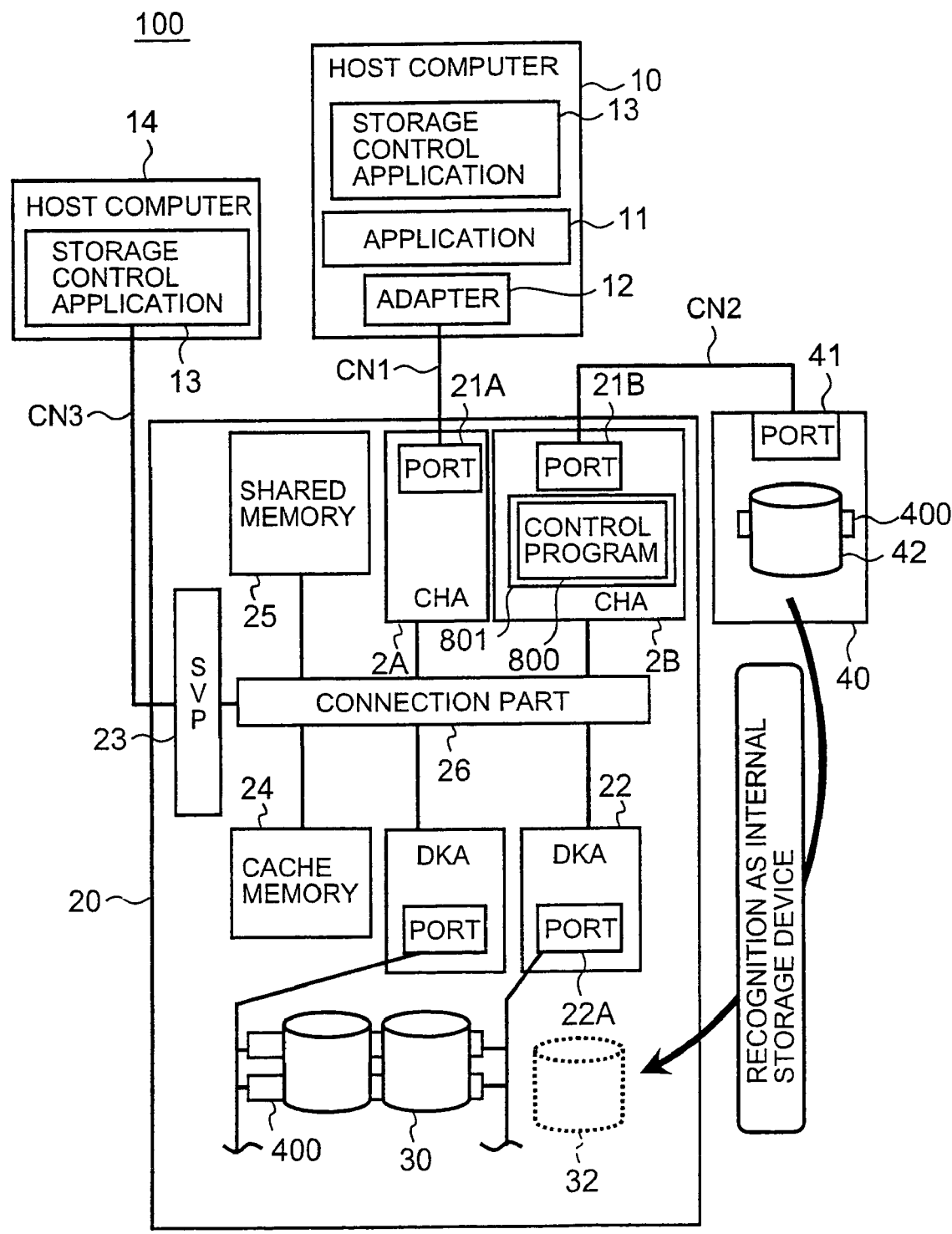
FIG. 1 shows the construction of the memory system in a first example of one embodiment of the present invention; of interest.

FIG. 1 shows the construction of the memory system in a first example of one embodiment of the present invention.

This memory system 100 comprises a first memory control device 20 which has one or more logical storage devices (hereafter abbreviated to "LDEV") 31, and a second memory control device 40 which has one or more LDEVs 42.

A host computer 10 is connected to the first memory control device 20 via a first communications network CN1, and the second memory control device 40 is connected to the first memory control device 20 via a second communications network CN2. Furthermore, another host computer 14 is connected to the first memory control device 20 via a third communications network CN3.

For example, the host computer 10 is a computer device comprising information processing resources such as a CPU (central processing unit), memory and the like. For instance, this host computer 10 is constructed from a personal computer, workstation, main frame computer or the like. The host computer 10 comprises an information input device (not shown in the figures) such as (for example) keyboard switches, a pointing device, a microphone or the like, and an information output device (not shown in the figures) such as (for example) a monitor display, speaker or the like. Furthermore, for example, an application program 11 such as data base software or the like using a memory region that is provided by the first memory control device 20, and an adapter 12 that is used to access the first memory control device 20 via the first communications network CN1, are disposed in the host computer 10.

Furthermore, the host computer 10 comprises a storage control application 13. For example, the storage control application 13 is a computer program that is read into and operated by a CPU (not shown in the figures); this program sends commands (control data) to the first memory control device 20, and controls the operation of the first memory control device 20. In concrete terms, for example, the storage control application 13 can select a copying source LDEV 31 (or 32) and a copying destination LDEV 31 (or 32) from the plurality of LDEVs 31 that are controlled by the first memory control device 20, and can cause the first memory control device 20 to copy data from the copying source to the copying destination.

The host computer 10 can input and output data into and from the first memory control device 20 via the first communications network CN1. For example, an LAN (local area network), an SAN (storage area network), the internet, a dedicated line, a public line or the like can be appropriately used as circumstances require as the communications network CN1. For example, data communications via an LAN are performed according to the TCP/IP (transmission control protocol/internet protocol) protocol. In cases where the host computer 10 is connected to the first memory control device 20 via an LAN, the host computer 10 designates files, and requests the input or output of data in file units. On the other hand, in cases where the host computer 10 is connected to the first memory control device 20 or the like via an SAN, the host computer 10 requests the input or output of data using blocks (which are data control units for memory regions provided by a plurality of disk storage devices (disk drives)) as units in accordance with a fiber channel protocol. In cases where the communications network CN1 is an LAN, the adapter 12 is (for example) a network card for an LAN. In cases where the communications network CN1 is an SAN, the adapter 12 is (for example) a host bus adapter. Furthermore, control data of the storage control application can be exchanged via the first communications network CN1.

The above has been a description of the host computer 10. Furthermore, the host computer 10 can also be connected to a second memory control device 40 via the second communications network CN2. Furthermore, the host computer 14 which is connected to the first memory control device 20 via the third communications network CN3 may have a construction similar to that of the abovementioned host computer 10. For example, the second communications network CN2 and third communications network CN3 may be constructed from an SAN, an LAN, the internet, a dedicated line, a public line or the like. The host computer 14 can transmit control data used to control the first memory control device 20 to the first memory control device 20 via the third communications network CN3.

For example, the first memory control device 20 is constructed as a disk array subsystem. However, the present invention is not limited to this; the first memory control device 20 can also be constructed as an intelligent type fiber channel switch with improved performance. The same is true of the second memory control device 40.

The first memory control device 20 comprises a controller part and one or a plurality of physical storage devices 400. For example, the controller part comprises a plurality of channel adapters (CHA) (e.g., two channel adapters) 2A and 2B, a plurality of disk adapters (DKA) 22, a service processor (SVP) 23, a cache memory 24, a shared memory 25, and a connecting part 26.

The CHAs 2A and 2B perform data communications with external devices (e.g., the host computer 10 or second memory control device 40), which are connected to the first memory control device 20. The respective CHAs 2A and 2B comprise communications ports 21A and 21B that are used to perform communications with external devices. In this example, the CHA 2A is connected to the host computer 10 via the communications port 21A and first communications network CN1, and the CHA 2B is connected to the second memory control device 40 via the communications port 2B and the second communications network CN2. The CHAs 2A and 2B are respectively constructed as microcomputer systems comprising an MP (microprocessor), memory and the like; these CHAs interpret and execute various types of commands that are received from the external devices. Network addresses (e.g., IP addresses or WWN) that are used to identify the CHAs are assigned to the CHAs 2A and 2B. In this case, the respective CHAs 2A and 2B can act individually as an NAS (network attached storage). Furthermore, the CHAs 2A and 2B can be operated by a control program 800 that is read into and operated by the MP 801. For example, this control program 800 can execute the judgment processing shown in FIG. 8 described later, and the processing shown in FIGS. 11 and 12.

The respective DKAs 22 are devices that exchange data with the physical storage devices 400. Each DKA 22 comprises a communications port 22A that is used for connection to the physical storage devices 400. Furthermore, each DKA 22 is constructed as a microcomputer system comprising a CPU, memory and the like. The respective DKAs 22 write data into the physical storage devices 400 and read out data from the physical storage devices 400 in accordance with commands from the CHAs 2A and 2B. In cases where data is input into or output from the physical storage devices 400, the respective DKAs 22 convert the logical addresses into physical addresses. In cases where the physical storage devices 400 are controlled according to a RAID, the respective DKAs 22 perform data access corresponding to the RAID construction.

The SVP 23 is a computer device which is operated in order to maintain or control the first memory control device 20. For example, this SVP 23 is a notebook type personal computer. The SVP 23 monitors the occurrence of trouble inside the device 20, and performs a display on a display screen (not shown in the figures). Furthermore, this SVP 23 can give instructions for the closing processing or the like of physical storage devices (e.g., hard disk drives) comprising LDEVs 31 on the basis of commands from the storage control application. The host computer 14 is connected to the SVP 23 via the third communications network CN3. The SVP 23 can receive data or commands from the host computer 14 via the third communications network CN3.

The cache memory 24 temporarily stores data that is received from the host computer 10, data that is read out from the LDEVs 31 and the like. Control information that is used to control the operation of the first memory control device 20, information that indicates the correspondence relationship between the respective LDEVs 31 and the respective physical storage devices 400 and the like are stored in the shared memory 25. Furthermore, in addition to the setting of work regions, various types of device control information such as support device information external device information and the like (described later) are also stored in the shared memory 25. Moreover, the LDEVs 31 can also be used as cache disks.

The connecting part 26 connects the respective CHAs 21, the respective DKAs 22, the SVP 23, the cache memory 24 and the shared memory 25 to each other. For example, the connecting part 26 can be constructed as a high-speed bus such as an ultra-high-speed cross bar switch or the like that performs data transfer by a high-speed switching operation. Furthermore, this part can also be constructed as a communications network such as an LAN or SAN, or can be constructed by a plurality of networks along with the above-mentioned high-speed bus.

For example, devices such as hard disks, flexible disks, magnetic tapes, semiconductor memories, optical disks or the like can be used as the physical storage devices 400. One or more LDEVs 31 are provided on one or a plurality of physical storage devices 400. Below, furthermore, in order to facilitate description, the LDEVs 31 that are disposed in the first memory control device 20 will be called "internal LDEVs 31", while the LDEVs 42 that are disposed in the second memory control device 40 will be called "external LDEVs 42".

The reference number 32 indicated by a dotted line in FIG. 1 indicates a hypothetical internal LDEV that is provided for the host computer 10 (or 14). In other words, the reference number 32 indicates a state in which the external LDEV 42 of the second memory control device 40 is hypothetically incorporated into the first memory control device 20. Specifically, in this example, the LDEV 42 which is present on the outside as seen from the first memory control device 20 is provided to the host computer 10 (or 14) as an LDEV 32 that is disposed inside the first memory control device 20. In other words, since the first memory control device 20 can provide the LDEV 42 of the second memory control device 40 to the host computer 10 as an LDEV 32 of the first memory control device 20 itself, the first memory control device 20 need not have any local LDEVs 31 that are governed directly by the first memory control device 20 itself (i.e., any physical storage devices 400 for providing such LDEVs 31). That is to say, the first memory control device 20 can provide memory resources to the host computer 10 even if the first memory control device 20 has absolutely no LDEVs 31.

The second memory control device 40 may have a construction similar to that of the first memory control device 20. For example, the second memory control device 40 comprises communications ports 41 and LDEVs 42. In addition, the second memory control device 40 may also comprise CHAs, DKAs and the like. The second memory control device 40 is connected to the first memory control device 20 via the second communications network CN2, and the external LDEVs 42 can be handled as internal LDEVs 32 of the first memory control device 20.

Figure 2:
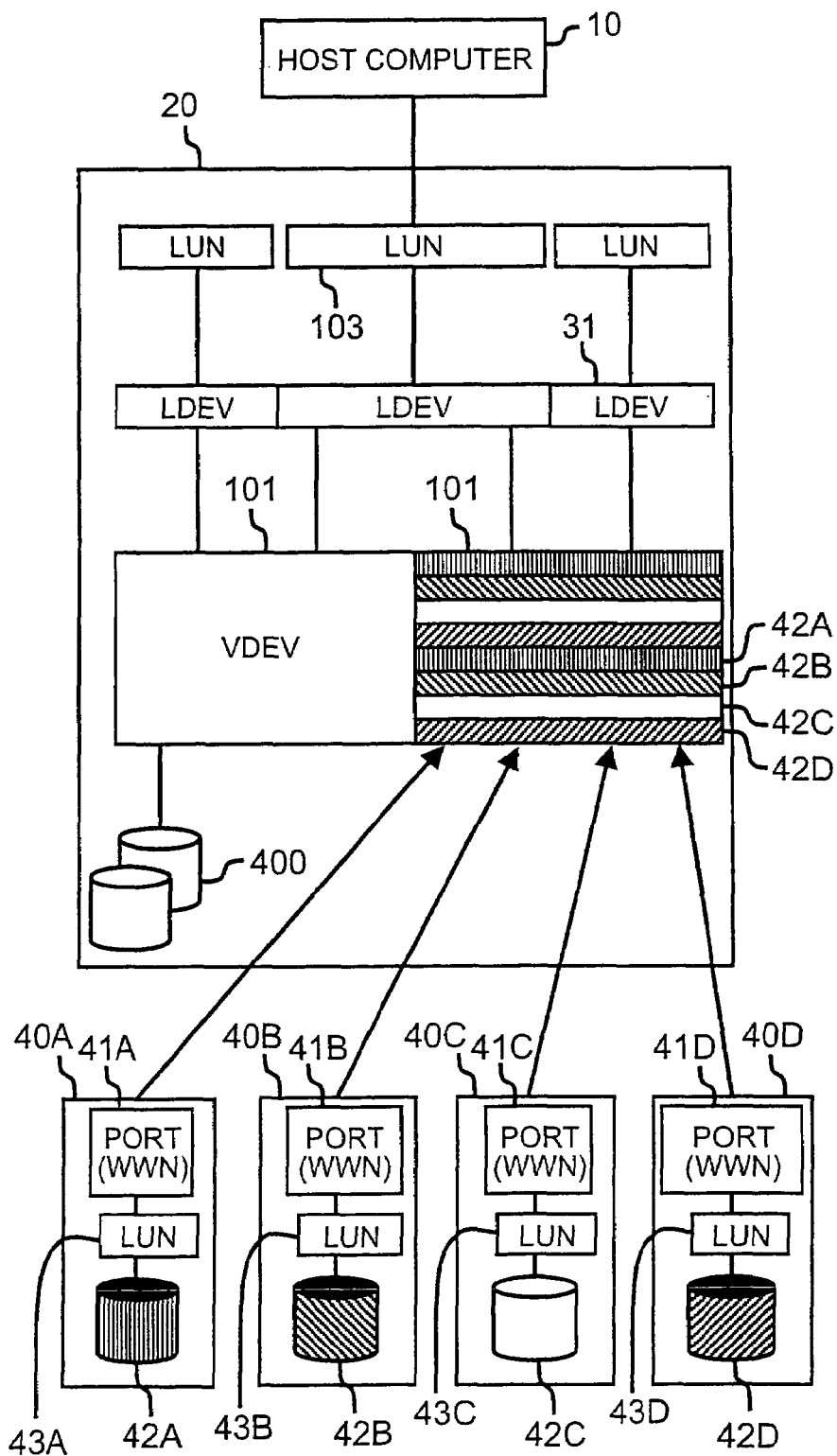
FIG. 2 shows greater details of portions of the example embodiment of FIG. 1.

FIG. 2 shows an outline of the device whereby the LDEVs 42 of the second memory control device 40 are provided to the host computer 10 as internal LDEVs 32 of the first memory control device 20.

The first memory control device 20 has a three-tiered memory hierarchy consisting of VDEVs 101, LDEVs 31 and 32, and LUNs 103 in that order from the side of the lower tier.

The VDEVs 101 are virtual devices that are positioned in the lowest rank of the logical memory hierarchy. The VDEVs 101 are devices in which physical memory resources are converted into virtual memory resources; these VDEVs can use a RAID construction. Specifically, a plurality of VDEVs 101 can be formed from a single physical storage device 400 (slicing), or a singe VDEV 101 can be formed from a plurality of physical storage devices 400 (striping). In the case of the VDEV 101 shown in the left side in FIG. 2, for example, a physical storage device 400 is converted into a virtual device according to a specified RAID construction.

On the other hand, the VDEV 101 shown on the right side in FIG. 2 is constructed by mapping an LDEV 42 of the second memory control device 40 (i.e., the physical storage device 400 that provides this LDEV 42). Specifically, in this example, the LDEV 42 provided by the physical storage device 400 of the second memory control device 40 is mapped onto the VDEV 101, so that this LDEV can be used as the internal LDEV 32 of the first memory control device 20. In the example shown in the figures, four second memory control devices 40A through 40D are provided, and these second memory control devices 40A through 40D are respectively provided with communications ports 41A through 41D to which WWN (world wide names) constituting unique identification information are assigned, LUNs (logical unit numbers) 43A through 43D, and LDEVs 42A through 42D. The respective LDEVs 42A through 42D can be specified by combinations of WWN and LUN (and furthermore, by (e.g.) second memory control device ID).

LDEVs 31 and 32 are disposed on the VDEVs 101. One VDEV 101 can be connected to one or plurality of LDEVs 31 (or 32), or a plurality of VDEVs 101 can be connected to a single LDEV 31 (or 32). The host computer 10 can access the LDEVs 31 and/or 32 via a specified or desired LUN 103.

Thus, in the present example, an external LDEV 42 can be utilized as one of the internal LDEVs 32 of the first memory control device 20 by connecting the external LDEV 42 to an intermediate memory tier (VDEV 101 and LDEV 32) positioned between the LUN 103 and external LDEV 42. In concrete terms, for example, in cases where the first memory control device 20 receives an I/O request (data write command or read command) for an internal LDEV 32 from the host computer 10 by means of the CHA 2A, the external LDEV 42 that is associated with the internal LDEV 32 via the VDEV 101 is accessed by the CHA 2B.

The above has been an outline of the memory system 100 of the present example.

In the present example, as was described above, the first memory control device 20 has an external connection function. This external connection function is a function that provides external LDEVs 24 to the host computer 10 as a memory resource of the first memory control device 20 by establishing a correspondence between the VDEVs 101 of the first memory control device 20 and the LDEVs 42 of the second memory control device 40 (i.e., by mapping). The first memory control device 20 must associate path information that is used to make connections with the external LDEVs 42 that are mapped onto the VDEVs 101 and confirmation information that is used to confirm that the connection destination is an external LDEV 42, and must hold this information. In this example, the external device information I3 shown in FIG. 3 corresponds to information that contains path information and confirmation information.

The external device information I3 can be prepared using reference commands. Reference commands are used to clarify the type and construction of the memory control device that constitutes the reference destination. The hierarchy of the reference destination device can be dropped, so that the physical structure can be grasped, from the response to the reference command of the reference destination (reference data). For example, reference commands can be converted into inquiry commands using a protocol according to SCSI. By transmitting an inquiry command to the second memory control device 40, the first memory control device 20 can receive reference data from the second memory control device 40, and can acquire specified data elements, e.g., vendor ID, device name, device number and characteristic information inside the device of the LDEV 42 (e.g., LDEV number), from the reference data. Using such data elements, it is possible to judge whether or not the connection destination LDEV 42 is the LDEV 42 that has been mapped onto the VDEV 101.

There may be cases in which the format of the reference data (which types of data elements are present in which positions of the reference data) varies according to the model of the second memory control device 40 constituting the reference destination. Accordingly, there may be cases in which information relating to the format of the reference data (e.g., information indicating what types of data elements are written in which positions) is needed for each model of the second memory control device.

Furthermore, in order to allow the connection of various models of memory control devices to the first memory control device 20 as the second memory control device 40, specified types of information such as supported-function information indicating what types of functions are supported are required for each model of memory control device. The reason for this is that in cases where the first memory control device 20 supports a certain function, and the second memory control device 40 that is to be connected to this first memory control device 20 does not support this certain function, there may be instances in which the performance of the first memory control device 20 cannot be sufficiently manifested. For example, information regarding the support or non-support of a copy function, which indicates whether or not a copy function is supported, may be used as supported-function information. This copy function is a function that allows the execution of data copying even when one of the LDEVs involved, i.e., either the LDEV that constitutes the copying source or the LDEV that constitutes the copying destination, is outside its own memory control device, in the same manner as in cases where both of the LDEVs are located inside.

Thus, in the present example, format information relating to the format of the reference data, supported-function information and the like are necessary for each model of the second memory control device 40 in order to allow the first memory control device 20 to manifest an external connection function. An example of information that includes format information and supported-function information is individual support device information such as that shown in FIG. 4. This individual support device information is prepared for each model of memory control device. Furthermore, one example of information that includes a plurality of sets of individual support device information is support device information such as that shown in FIG. 4.

The external device information and support device information will be described below.

Figure 3:
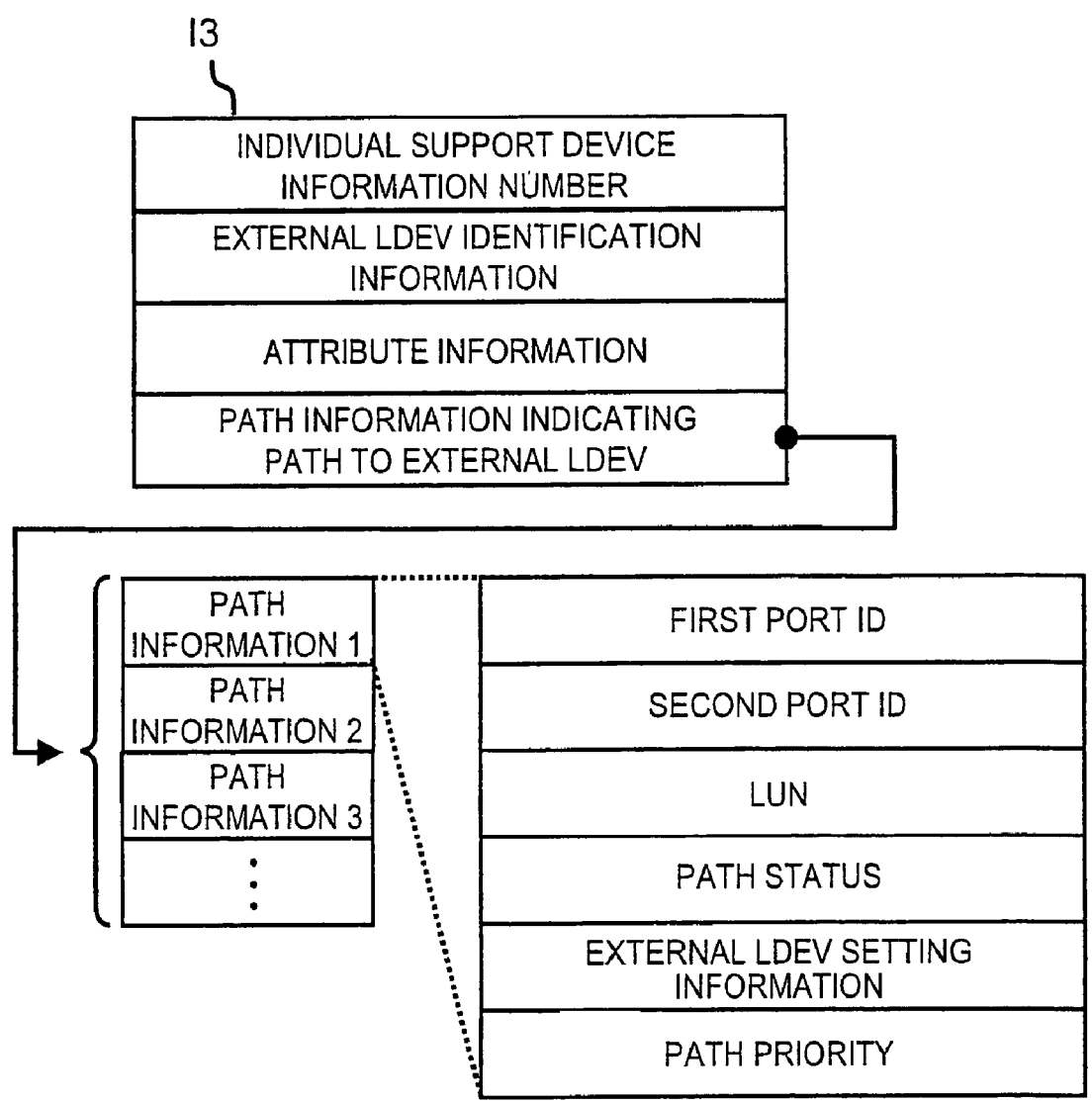
FIG. 3 shows an example of the construction of external device information.

FIG. 3 shows an example of the construction of the external device information.

As is shown in FIG. 3, the external device information includes an individual support device information number, external LDEV identification information, attribute information, and path information indicating the path to the external LDEV.

The individual support device information number is a number (e.g., a consecutive number) that is used to identify the individual support device information. Specifically, an indication of the individual support device information that was used in the preparation of the external device information I3 is held in the external device information I3. As was described above, individual support device information is prepared for each model; accordingly, for example, the first memory control device 20 can discriminate the model of the second memory control device 40 that has the external LDEV 42 that is mapped by referring to the individual support device information.

The external LDEV identification information is information that is used to judge the appropriateness of the external LDEV 42 that is mapped. Here, since the abovementioned individual support device information is available as information that is used to discriminate the model of the second memory control device 40 that has the external LDEV 42, the external LDEV identification information includes information that is separate from this individual support device information. For example, the external LDEV identification information is information that includes a memory control device serial number, and characteristic information (e.g., LDEV number) inside the memory control device of the LDEV 42. Below, the external LDEV 42 that is identified from the external LDEV identification information will be referred to in some cases as the "object external LDEV 42".

The attribute information is information that indicates the properties of the object external LDEV 42 (e.g., information that indicates whether or not the object external LDEV 42 is an LDEV that can be used by the copy function of the first memory control device 20).

The path information indicating the path to the external LDEV is information indicating the access path that is used to access the object external LDEV 42. A plurality of paths to the object external LDEV 42 can be defined; accordingly, in cases where a plurality of paths are defined, a corresponding number of sets of path information are also prepared. For example, the path information consists of a first port ID, second port ID, LUN, path status, external LDEV setting information and path priority.

Here, the first port ID is information (e.g., a number) that is used to identify the communications port 21B of the first memory control device 20 that is connected to the object external LDEV 42.

The second port ID is information (e.g., WWN) that is used to identify the communications port 41 of the second memory control device 40 that can be connected to the object external LDEV 42.

The LUN is the LUN that is connected to the object external LDEV 42 and communications port 41 (among the plurality of LUNs of the second memory control device 40). For example, the correspondence between the LUNs and the external LDEVS can be a one-to-one correspondence. Of course, this correspondence is not limited to a one-to-one correspondence, and may be a correspondence of a plurality to one or a correspondence of one to a plurality.

The path status is information that is used to judge whether or not the path that is specified from the first port ID, second port ID and LUN can be used. For example, the path status shows "normal" information in cases where the path in question can be used, and shows "closed" information in cases where the patht in question is unusable for some reason.

The external LDEV setting information is information that is set for the object external LDEV 42 inside the second memory control device 40 that has this external LDEV 42. For example, this information is alternate path setting information. This alternate path setting information is information that is used to discriminate between the main path and the alternate path in cases where an alternate path construction is incorporated for the LDEVs 42 of the second memory control device 40, and a path that is in operation (main path) and path that is not in operation (alternate path) are set.

The path priority information is information that sets the priority of use of the path in question among the defined paths. For example, if two paths are prepared for the object external LDEV 42, then two sets of path information exist. In such a case, for example, the path priority information in one set of path information indicates a priority of "1", and the path priority information in the other set of path information indicates a priority of "2", which is lower than the priority of "1". The question of which priority is set for which path can be determined automatically according to a specified rule, or can be determined manually. For example, the first memory control device 20 ordinarily accesses the object external LDEV 32 via the path with a higher priority by referring to these sets of path information. However, in cases where this path is closed, the first memory control device 20 can access the object external LDEV 32 using the path that has a lower priority.

The above has been a description of the external device information I3. For example, the external device information I3 is information that is associated with the LDEV number of the virtual internal LDEV 32 in the shared memory 25. Specifically, in cases where the number of the virtual internal LDEV 32 is designated by the host computer 10, the first memory control device 20 can provide the memory resources of the second memory control device 40 to the host computer 10 as memory resources of the first memory control device 20 by specifying the external device information I3 that is associated with this number, and accessing the external LDEV 42 on the basis of the content of the specified external device information I3.

Figure 4:
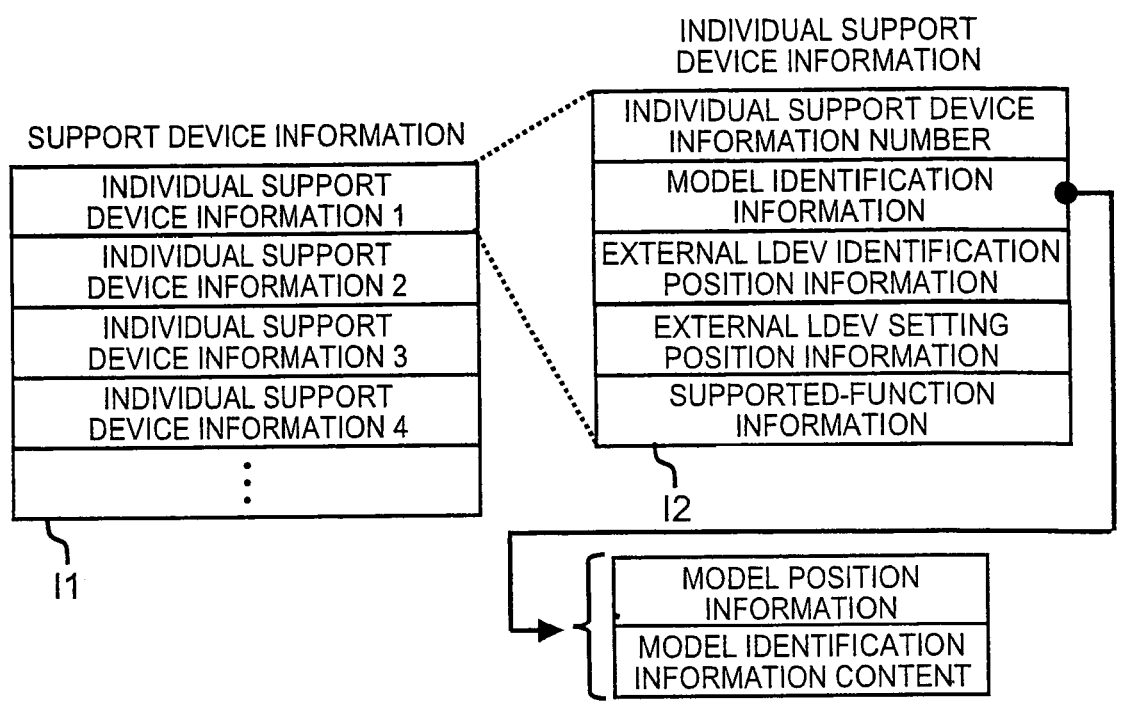
FIG. 4 shows an example of the construction of support device information.

FIG. 4 shows an example of the construction of the support device information.

The support device information I1 includes individual support device information I2 that has been prepared for each mode. The individual support device information I2 an individual support device information number that is used to discriminate this information I2, model identification information, external LDEV identification position information, external LDEV setting position information and supported-function information.

The individual support device information number is a number that is used to identify this information I2. By referring to this number, it is possible to acquire individual support device information corresponding to the individual support device information number contained in the above-mentioned external device information I3.

The model identification information is information that is used to discriminate the model of the reference destination from the reference data. The model identification information includes model position information that indicates the area in the reference data to which reference can be made in order to discriminate the model, and model identification information content indicating the model identification information that is to be acquired from the reference data. The first memory control device 20 acquires one or more data elements from the reference data position indicated by the model position information, and in cases where the one or more acquired data elements match (e.g., coincide) with the model identification information content, the first memory control device 20 judges the model of the second memory control device 40 that transmitted the reference data to be the model corresponding to the individual support device information in question. Examples of the abovementioned one or more data elements (i.e., model identification information content) acquired from the reference data include vendor ID and device name.

The external LDEV identification position information is information indicating the position in the reference data to which reference can be made in order to acquire external LDEV identification information. For example, as was described above, the external LDEV identification information is information that includes a device number and characteristic information inside the device 40 of the external LDEV 42 (e.g., LDEV number).

The external LDEV setting position information is information indicating the position in the reference data to which reference can be made in order to acquire external LDEV setting information. For example, the external LDEV setting information is the abovementioned alternate path setting information.

The supported-function information is information indicating the functions that are supported; this is special information that is set for each model of the second memory control device 40. For example, the supported-function setting information is information indicating whether or not a copy function is supported (as described above).

Below, one example of the flow of the processing that is performed in order to prepare external device information from the support device information and reference data will be described with reference mainly to FIGS. 5 and 6, and with reference as appropriate to FIG. 7. Furthermore, FIG. 7A shows an example of the construction of the reference data that is transmitted by the second memory control device. FIG. 7B shows one example of the content of the support device identification information corresponding to a first model (hereafter referred to as the first individual support device information). FIG. 7C shows one example of the content of the support device identification information corresponding to a second model (hereafter referred to as the second individual support device information). FIG. 7D shows one example of the content of the external device information that is produced.

The first memory control device 20 (e.g., the CHA 2B inside this device 20) sends a reference command via the second communications network CN2 to the second memory control device 40 that is connected to the CHA 2B (step S11). The content of this reference command may be a reference relating to all of the LDEVs disposed in the second memory control device 40 that constitutes the reference destination, or may be a reference relating to one (or a plurality) of LDEVs among the plurality of LDEVs. In the latter case, for example, the first memory control device 20 sends the reference command via a path that is specified from the ID of the port 21A of the CHA 2B, the ID of the port 41 of the second memory control device 40, and the LUN 43.

In response to this reference command, the second memory control device 40 (e.g., the CHA inside this device 40) acquires a plurality of data elements used to construct the data from the control information and the like controlled by the device 40, produces reference data that contains the plurality of data elements thus acquired, and sends the produced reference data back to the first memory control device 20. As a result, the first memory control device 20 acquires reference data (S12). An example of the construction of this reference data is shown in FIG. 7A. Specifically, in this reference data I4, the model identification information "AAB" is described in the positions A1 through A3, the external LDEV identification information "LDEV1" is described in the positions C4 through C8, and the external LDEV setting information "MAP" (main path) is described in the positions E3 through E5. For example, this reference data I4 is acquired for each LDEV disposed in the second memory control device 40. In other words, for example, N sets of reference data I4 are produced in a case where there are N LDEVs 42.

The first memory control device 20 performs processing that judges the corresponding individual support device information I2 using the reference data I4 acquired in S12 (S13).

In concrete terms, for example, the first memory control device 20 refers to the first individual support device information in the shared memory 25 (see FIG. 7B), and acquires data elements from the reference data positions A1 through A3 where the model identification position information of this information I2 is indicated. According to the reference data I4 in FIG. 7A, the data elements acquired here constitute "AAB". The first memory control device 20 compares this "AAB" and the content of the model identification information in the first individual support device information I2. According to FIG. 7B, the content of the model identification information is "AAA" (ex: device A), which does not match the information "AAB" (ex: device B) acquired from the reference data. Accordingly, the results of the comparison indicate "no match". As a result, the first memory control device 20 can judge that the first individual support device information I2 is not the individual support device information that corresponds to the second memory control device 40 constituting the reference destination. In this case, the first memory control device 20 refers to other individual support device information, and, using this other individual support device information and the reference data I4, judges whether or not the individual information is information that corresponds to the model of the second memory control device 40 that is the reference destination. By repeating such processing, the first memory control device 20 can find the individual support device information I2 that corresponds to the model of the second memory control device 40 that is the reference destination. In the example shown in FIGS. 5 through 7, the information acquired from the reference data I4 using the second individual support device information I2 (see FIG. 7C) is "AAB", and the content of the model identification information of this individual information I2 is also "model B"; accordingly, a match is obtained as the result of the comparison. Consequently, the first memory control device 20 can judge that the second individual support device information is individual support device information that corresponds to the model of the second memory control device 40 that is the reference destination.

Following S13, the first memory control device 20 refers to the external LDEV identification position information and external LDEV setting position information contained in the second individual support device information I2 that has been judged to correspond to the second memory control device 40 that is the reference destination, and acquires external LDEV identification information and external LDEV setting information from the reference data positions respectively indicated by these sets of information (S14). In this S14, in the example shown in FIGS. 7A and 7C, "LDEV1" is acquired as the external LDEV identification information, and "MAP" is acquired as the external LDEV setting information.

The first memory control device 20 produces external device information I3 using the individual support device information I2 judged in S13 and the information acquired in S14, and stores the produced external device information I3 in the shared memory 25 (S15). In this S15, according to the example shown in FIGS. 7A through 7C, the external device information I3 shown for example in FIG. 7D is produced. In concrete terms, for example, since the number "2" is included in the individual support device information I2 judged in S13, the individual support device information number contained in the external device information I4 is "2". Furthermore, since the information items "LDEV1" and "MAP" are acquired in S14, "LDEV1" is set as the external LDEV identification information, and "MAP" is set as the external LDEV setting information, in the external device information I3. Furthermore, the first port ID, second port ID and LUN are set on the basis of the path that transmitted the reference command. The attribute information is set within a range permitted by the supported-function information in the individual support device information judged in S13. In this example, since "copy function supported" is shown in the supported-function information of the second individual support device information, either "copy function supported" or "copy function not supported" can be set (the setting of either of these can be set manually by the user, or can be set automatically in accordance with a specified rule). Here, "copy function supported" is set. The path priority is set automatically or manually at the time that the external device information is prepared. Here, since only a single path is defined, the path priority is set as "1".

The above is the flow of the processing that prepares the external device information. The external device information thus prepared can be associated with the numbers of the internal LDEVs 32 in the shared memory 25.

Next, one example of the flow of the processing used to judge the appropriateness of the external LDEV that is the connection destination will be described with reference to FIG. 8.

Figure 5:
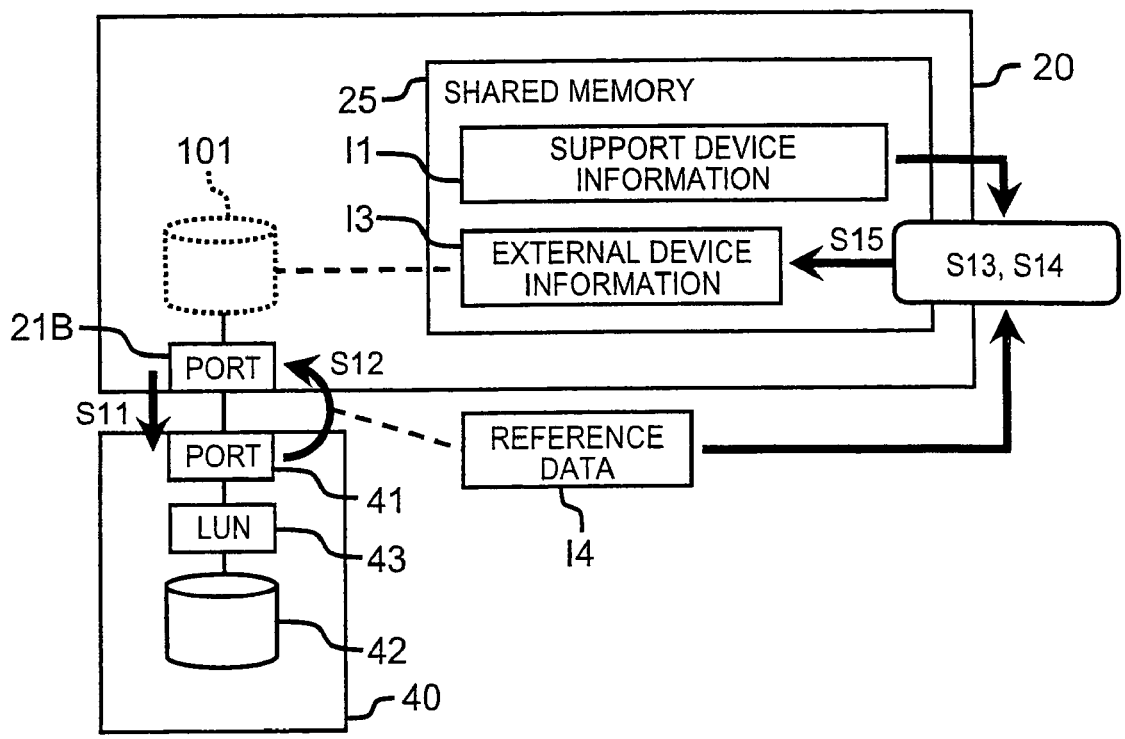
FIG. 5 shows one example of the flow of the processing that is performed when external device information is prepared from support device information and reference data.
Figure 6:
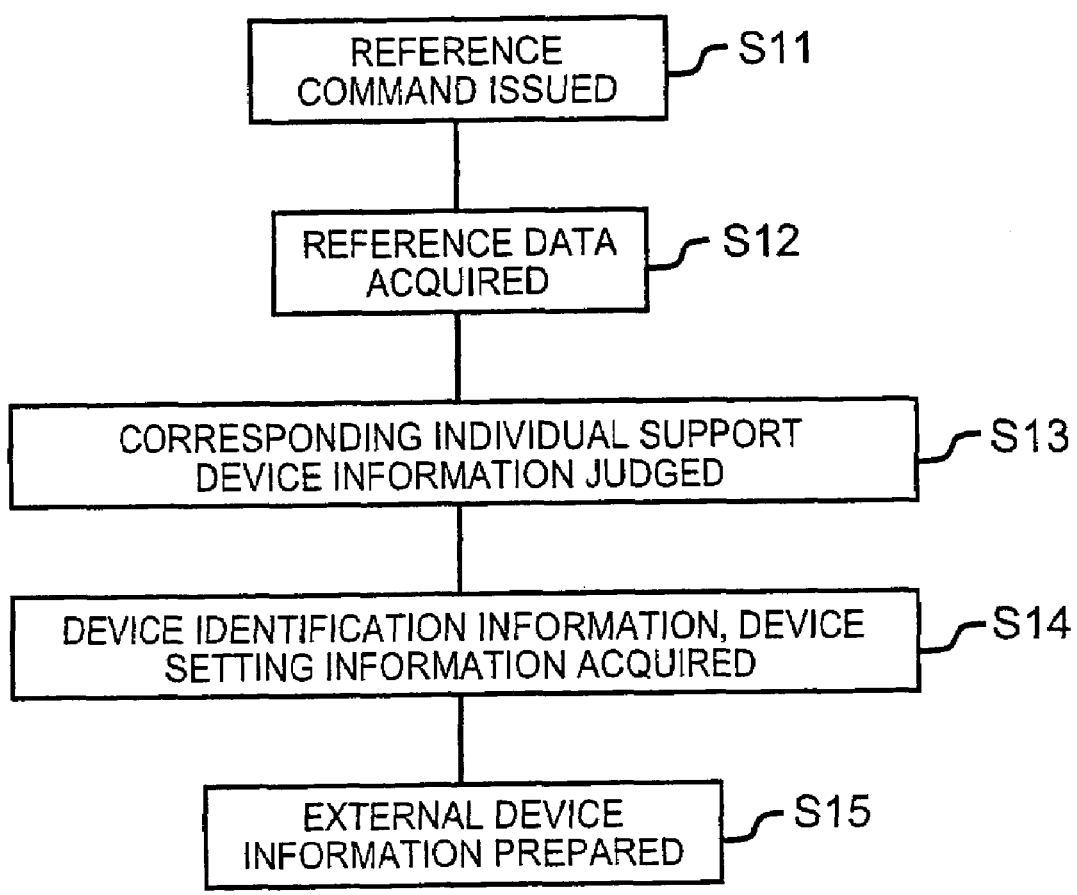
FIG. 6 shows one example of the flow of the processing that is performed when external device information is prepared from support device information and reference data.

The first memory control device 20 sends out a reference command by the same method as in S11 in FIGS. 5 and 6 (S21). In response to this command, the first memory control device 20 receives reference data in the same manner as in S12 (S22) from the second memory control device 40.

The first memory control device 20 acquires individual support device information corresponding to the individual support device information number from the individual support device information number of the external device information I3 associated with the VDEV 101, and acquires a first data element that is located in the reference data position indicated by the model identification position information in this individual information, and a second data element that is located in the reference data position indicated by the external LDEV identification position information in this individual information (S23). Here, in cases where meaningless data (e.g. null data) is present in these positions, this meaningless data is acquired.

Furthermore, the first memory control device 20 acquires external LDEV identification information from the external device information I3 that is associated with the VDEV 101, and acquires the model identification information content from the individual support device information corresponding to this external device information I3 (S24). In this S24, according to the example shown in FIGS. 7A, 7C and 7D, "AAB" is acquired as the model information content, and "LDEV1" is acquired as the external LDEV identification information.

Subsequently, the first memory control device 20 performs a comparison (first comparison) of the content of the first data element acquired in S23 and the content of the model identification information acquired in S24, and performs a comparison (second comparison) of the second data element acquired in S23 and the external LDEV identification information acquired in S24.

If both the results of the first comparison and the results of the second comparison indicate a match, the first memory control device 20 judges that the reference destination is the mapped external LDEV (in other words, the appropriate external LDEV) (S26). On the other hand, if at least one of these sets of results, i.e., either the results of the first comparison or the results of the second comparison, show a non-match, the first memory control device 20 judges that the reference destination is not the mapped external LDEV (in other words, an inappropriate external LDEV) (S27). In the case of S26, the first memory control device maintains the connection with the reference destination, while in the case of S27, the connection with the reference destination may be cut off.

Thus, in this first example, the first memory control device 20 holds the external device information I3 and support device information I1, and prepares the external device information I3 using the reference data received from the second memory control device 40 that is the reference destination, and the support device information I1.

A method in which this support device information is stipulated within the program by on-coding is also conceivable (e.g., a method in which this information is stipulated in the control program 800 is conceivable). In such a method, however, replacement of the control program 800 is necessary in cases where the support device information is updated (e.g., in cases where there is an increase in the number of models of the second memory control device that can be connected as a result of the addition of new individual support device information to existing support device information), or in cases where the information that is used as the external LDEV identification information is altered as a result of the alteration of the external LDEV identification position information of the existing individual support device information or the like. Specifically, updating of the support device information is impossible in cases where the control program 800 is in operation.

Figure 9:
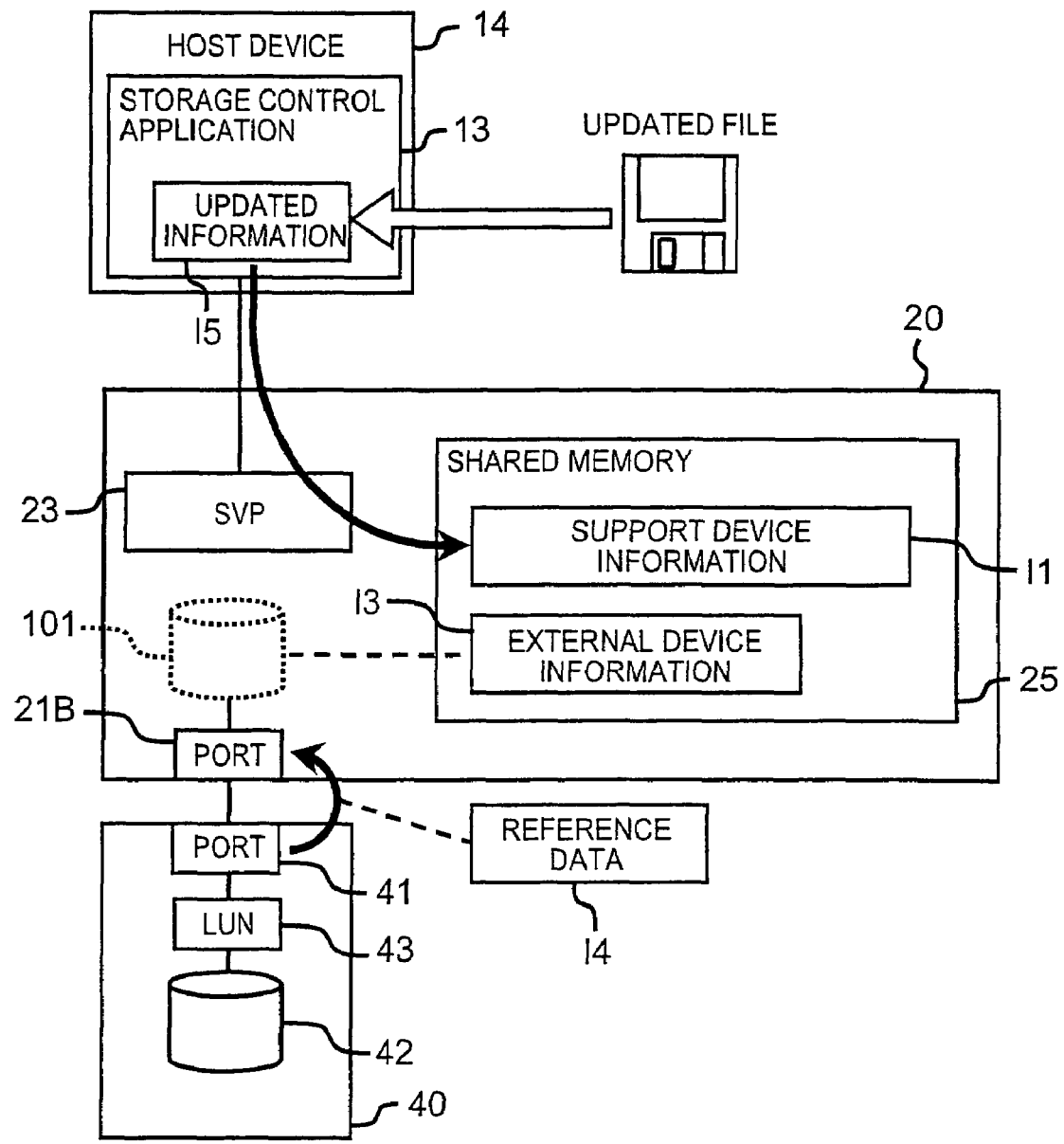
FIG. 9 shows one example of the processing that is performed by the storage control application.

However, in the present example, as was described above, the support device information is installed separately from the control program 800. Accordingly, as is shown for example in FIG. 9, the storage control application that is installed in the host computer 14 (or 10) can prepare information (hereafter referred to as updated information) I5 in which all or part of the individual support device information I2 is updated, or such information can be read in from an external device (e.g., a portable memory medium), and this updated information I5 can be included in the support device information I2 at an arbitrary timing. Specifically, changes in the models that can be used as the second memory control device with an external connection function, changes in the information indicating the reference position of reference data, and changes made by the first memory control device 20 in the functions that can be used by the LDEVs 42 of the second memory control device 40 and the LDEVs 32 of the mapped VDEV 101, can be freely performed regardless of whether or not the control program 800 is in operation.

For example, in the present embodiment, the storage control application 13 provides a GUI (graphical user interface) screen such as that shown in FIGS. 10A through 10C. The storage control application 13 can prepare updated information I5 while displaying support device information I1 following the reflection of the updated information I5 on a display screen. For example, functions of the storage control application 13 include "reference to support device information", "reading in of updated information from updated file", "editing of support device information", "addition of individual support device information", "saving of support device information", "acquisition of reference data" and "reflection of updated information in shared memory". These respective function will be described below.

The abovementioned "reference to support device information" is a function in which the support device information I1 held in the shared memory 25 of the first memory control device 20 is acquired, and displayed on the GUI screen. In FIGS. 10A and 10B, it is shown that individual support device information which allows the use of three models respectively corresponding to the individual support device information numbers 1, 2 and 3 as the second memory control device is present in the shared memory 25. For example, in a case where individual support device information desired by the user (e.g., information with the number of "3") is selected, and "detail" in the pop-up menu is selected (as shown in FIG. 10B), the detail information dialog shown for example in FIG. 10C is displayed, and respective individual support device information items can be displayed in this dialog.

The "reading in of updated information from an updated file" is a function which can read in updated information by designating an updated file of the support device information in the host computer or in a portable memory medium (e.g., a flexible disk). Here, the updated file is (for example) is a file in which updated information of the support device information is stored; this file may contain one or a plurality of sets of updated individual support device information I2. For example, the system is devised so that in cases where the storage control application 13 reads in individual support device information I2 that is not contained in the support device information I1 of the shared memory 25 from the updated file, and causes the updated information I5 to be reflected in the shared memory 25, the external LDEV 42 of the second memory control device of the model corresponding to the individual support device information that is read in from the updated file can be mapped. In cases where this updated information I5 is stored in the shared memory 25, the individual support device information corresponding to this updated information within the support device information I1 is changed to this updated information. Furthermore, by means of the function of "editing of the individual support device information" described later, the storage control application 13 allows the user to edit the updated information that is read in from the updated file on the GUI screen.

The abovementioned "editing of the individual support device information" is a function whereby updated information is prepared by directly editing respective items of the individual support device information in the detail information dialog.

The "addition of individual support device information" is a function that is used to prepare new individual support device information on the GUI screen, and to use this information as updated information. For example, the individual support device information numbers "1", "2" and "3" are seen in FIGS. 10A and 10B; however, by using this function, the storage control application 13 can prepare new individual information to which the individual support device information number "4" is assigned (i.e., individual information corresponding to a new model), and can add this model (which can be used as a second memory control device with an external connection function) by reflecting this information in the shared memory 25.

The "saving of support device information" is a function that saves support device information in the host computer in which the storage control application is operating by designated saved file names. For example, the information that is saved may be information acquired from the shared memory 25 of the first memory control device 20, or support device information that is being edited on the GUI screen. The saved information can be used "as is" as an updated file, and can be read into the GUI screen using the function of "reading in of updated information from the updated file". As a result, for example, in cases where support device information from the shared memory 25 of the first memory control device 20 is saved, this information can be used as a backup of the support device information, and can be utilized in cases where it is subsequently desired to return the support device information to the original state. Furthermore, in cases where support device information that is being edited on the screen is saved, the preparation of updated information from the saved state can be continued by subsequently reading in this information, which is useful in cases where a temporary interruption of the preparation of updated information is desired.

The "acquisition of reference data" is a function which designates LDEVs, and acquires and displays reference data from the designated LDEVs. Furthermore, this reference data can also be saved in the host computer 14 (or 10) in which the storage control application 13 is in operation. For example, reference data for VDEVs of the first memory control device with an external connection function and external LDEVs for which mapping is desired can be acquired using this function, and updated information of the support device information can be created by analyzing the acquired reference data, so that the external LDEVs in question can be mapped.

The "reflection of updated information in the shared memory" is a function whereby updated information of the support device information is reflected in the shared memory 25 of the first memory control device using the functions of "reading in of updated information from the updated file", "editing of individual support device information" and/or "addition of individual support device information".

In cases where the first memory control device 20 receives updated information of the individual support device information in the support device information saved by the first memory control device 20 itself from the host computer 14 (or 10), the first memory control device 20 can execute control processing that determines whether or not this updated information is reflected in the support device information or the like.

Figure 12:
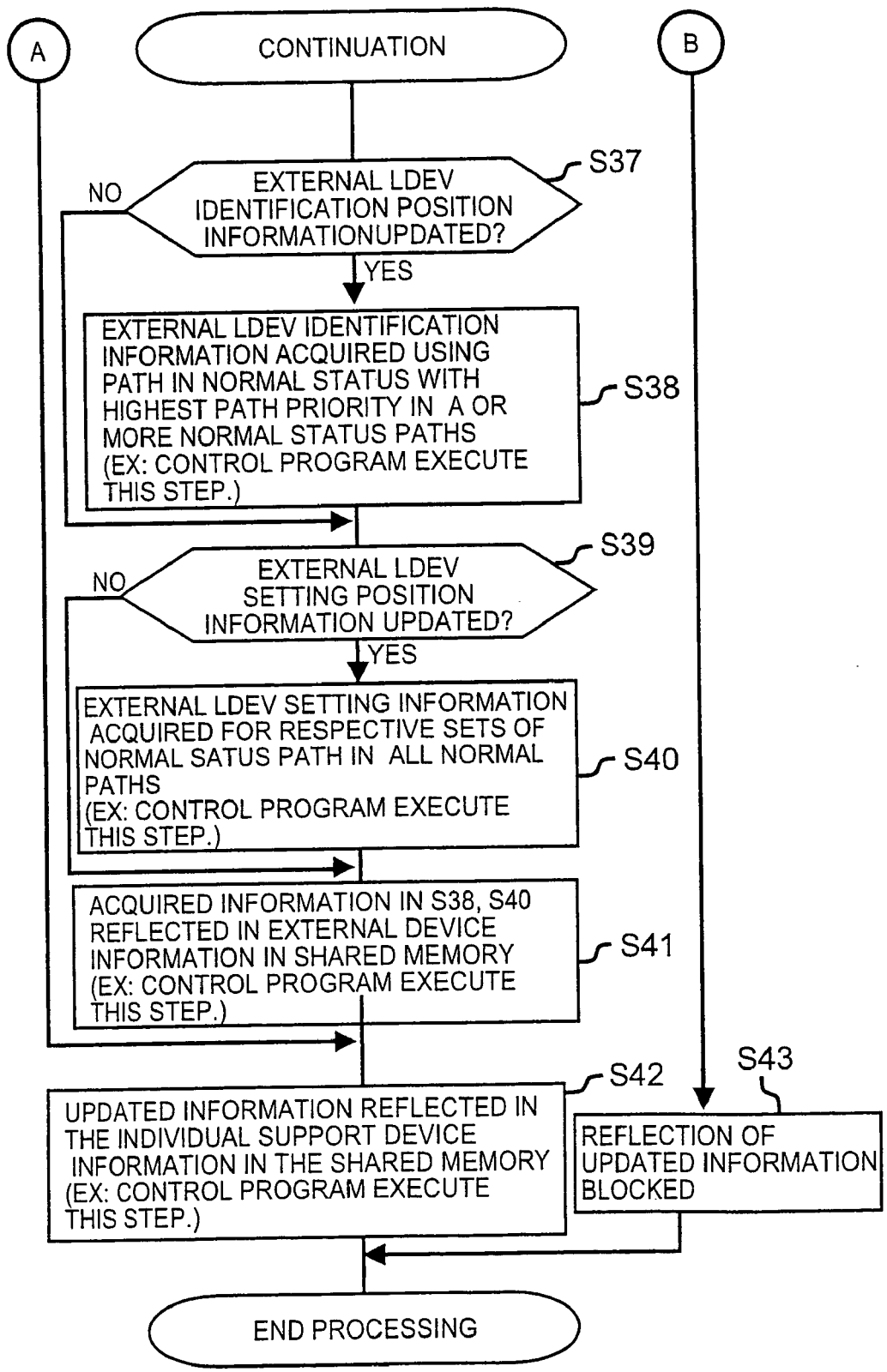
FIG. 12 shows a continuation of the flow shown in FIG. 11.

FIGS. 11 and 12 show one example of the flow of the processing that is executed by the first memory control device 20 when updating of the individual support device information is performed. In cases where a plurality of sets of individual support device information are updated, this can be accomplished by performing the processing shown in FIGS. 11 and 12 for the respective sets of individual support device information.

In cases where updated information is to be input, the first memory control device 20 (e.g., the CHA 2A or SVP 23 in this memory control device 20) specifies the individual support device information corresponding to this updated information (hereafter referred to as the "object individual information") (S31).

The first memory control device 20 judges whether or not external device information has been prepared using object individual information (S32). For example, this judgment can be performed, for example, by investigating whether or not external device information that has the same number as the individual support device information number corresponding to the object individual information.

In cases where negative judgment results are obtained as a result of S32 (NO in S32), the first memory control device 20 overwrites the updated information input in S31 on the object individual information in the shared memory 25 (S42)

On the other hand, in cases where affirmative judgment results are obtained as a result of S32 (YES in S32), specified information contained in the external device information and specified information contained in the individual support device information following updating may not match when the individual support device information is updated, e.g., trouble such as the inability to correctly recognize the external LDEV 42 that is mapped on the VDEV 101 of the first memory control device 20 may occur. The types of trouble that may occur vary depending on the information items of the individual support device information that are updated; furthermore, the method that is used to prevent trouble from occurring also varies according to the information items that are updated.

Here, the information items of the individual support device information whose updating might lead to the occurrence of trouble will be investigated, and the methods used to prevent the occurrence of trouble in cases where such trouble might occur will also be investigated.

One information item of the individual support device information is (for example) model identification information. For example, this model identification information is used in the processing that judges the appropriateness of the external LDEVs (see FIG. 8). Accordingly, if the model identification information is updated, it is conceivable that a result of non-matching may occur in S25 of the judgment processing. However, since model identification information acquired from individual support device information and model identification information acquired from the reference data, it would seem that there would be no non-matching of information if the model identification information of the individual support device information is updated in accordance with the reference data that is acquired.

Furthermore, one information item of the individual support device information is (for example) external LDEV identification position information. This position information is information that indicates where the external LDEV identification information is located in the reference data.

The external LDEV identification information acquired from the reference data position indicated by this position information is contained in the external device information. Accordingly, in cases where only the external LDEV identification position information of the individual support device information is updated, non-matching may occur between the external LDEV identification information held as external device information and the information acquired from the reference data position indicated by external LDEV identification position information following updating. In this case, even if the external LDEV 42 that is the reference destination is the external LDEV 42 that is mapped on the VDEV, it may be judged in S25 of FIG. 8 that the reference destination is not the mapped external LDEV, so that this LDEV cannot be used. One conceivable counter method for preventing such trouble from occurring is a method which is devised so that in cases where the external LDEV identification position information is updated, the external LDEV identification information is re-acquired from the reference data using the external LDEV identification position information in the updated information, and is reset in external device information according to the object individual information (i.e., a method in which the external device information is updated).

Furthermore, one information item of the individual support device information is (for example) external LDEV setting position information. This position information is information that indicates where the external LDEV setting information is located in the reference data. The external LDEV setting information acquired from the reference data position indicated by this position information is contained in the external device information. Accordingly, in cases where the external LDEV setting position information of the individual support device information is updated, since the external LDEV setting information corresponding to the position information prior to updating is held "as is" in the external device information, information expected for the model corresponding to the individual support device information following updating is not acquired. In this case, the mapped external LDEV 42 may cease to operate normally. In concrete terms, for example, in cases where the number of bytes of the alternate path setting information (one type of external LDEV setting information) is expanded from 3 bytes to 5 bytes (e.g., in cases where the information is expanded from the positions E3 through E5 to the positions E3 through E7 in the reference data I4 shown in FIG. 7A), the external LDEV setting information is insufficient by 2 bytes; accordingly, the alternate path setting cannot be recognized. One conceivable counter method for preventing the occurrence of such trouble is a method in which the external LDEV setting information is re-acquired using the external LDEV setting position information of the updated information in cases where the external LDEV setting position information is updated, and this external LDEV setting information is reset in the external device information in question.

Furthermore, one information item of the individual support device information is (for example) supported-function information. In cases where there are functions that are unsupported following the updating of the supported-function information, the expected operation cannot be performed when these functions are used. For example, in cases where "copy function supported" becomes "copy function not supported", the attribute information of the external device information prepared prior to updating does not contain the information "copy function supported". Accordingly, in the setting of the copy function of the first memory control device 20, a setting in which copying is performed for the external LDEV 42 mapped on the VDEV 101 is performed. In actuality, however, since the copy function is not supported, the external LDEV 42 does not operate normally. One example of a counter method that is used to prevent the occurrence of such trouble is a method in which the processing used to reflect the updated information is blocked (i.e., in which updating of the individual support device information is not performed) in cases where unsupported functions are held as being usable in the attribute information of the external device information that is prepared using the individual support device information prior to updating.

As was described above, in cases where the external LDEV identification position information and external LDEV setting position information are updated, the external LDEV identification information and external LDEV setting information of the external device information must be re-acquired suing the updated information, and this external device information must be updated together with the individual support device information. Furthermore, if functions that were supported in the supported-function information prior to updating are updated to unsupported functions, and these functions are held as being usable in the external device information, there is no reflection of the updated information.

On the basis of the above facts, the updating processing of individual support device information for which external device information has already been prepared will be described with reference again being made to FIGS. 11 and 12.

The first memory control device 20 performs a check of the supported-function information (S33). In this S33, for example, the first memory control device 20 compares the supported-function information in the updated information and the supported-function information in the existing individual support device information (information prior to updating), and investigates whether or not there are any unsupported functions. In cases where there are unsupported functions, the first memory control device 20 investigates whether or not these functions are considered to be usable in the external device information prepared using the above-mentioned individual support device information (S34). In cases where the functions are held as being usable (YES in S34), the first memory control device 20 blocks the reflection processing of the updated information (S43).

In S14, in cases where there was no problem in the check of the supported-function information (NO in S33), the first memory control device 20 investigates whether or not the external LDEV identification position information or the external LDEV setting position information, or both, are updated (S35). For example, this can be investigated by respectively comparing the external LDEV identification position information and external LDEV setting position information in the updated information, and the external LDEV identification position information and external LDEV setting position information prior to updating.

In cases where the information is updated (YES in S35), the first memory control device 20 must acquire external LDEV identification information and/or external LDEV setting information from the reference position data respectively indicated by the external LDEV identification position information and/or external LDEV setting position information prior to updating when the individual support device information is updated, and must set the acquired information in the external device information corresponding to the individual support device information following updating.

Here, when the external LDEV identification information and/or external LDEV setting information is again acquired from the reference data, the external LDEV 42 that is the reference destination must be the same external LDEV as the reference destination at the time of the previous preparation of external device information. Accordingly, the first memory control device 20 performs the judgment processing described with reference to FIG. 8 using the individual support device information prior to updating and the external device information corresponding to this information (S36). In this judgment processing, in cases where it cannot be judged that the object external LDEV is the mapped LDEV (NO in S36), the individual support device information and corresponding external device information cannot be updated; accordingly, the first memory control device 20 acts so that the updated information is not reflected (S43).

On the other hand, when an affirmative judgment is made (YES in S36), the first memory control device 20 issues a reference command for the external LDEV via the path (in a normal state) with the highest path priority in cases where the external LDEV identification position information is updated (YES in S37), receives reference data via this path in response to this command, and acquires external LDEV identification information from the reference data position indicated by the external LDEV identification position information following updating (S38). Specifically, in this S38, in cases where a plurality of sets of path information are contained in the external device information of the external LDEV that is the reference destination, the first memory control device 20 can select the path with the highest path priority (which has a normal path status) by referring to the plurality of sets of path information and the plurality of path priorities respectively contained in the plurality of sets of path information. The first memory control device 20 can investigate the states of the respective paths with respect to the external LDEVS either periodically or at irregular intervals, and in cases where a path is closed, the first memory control device 20 can include the state of "closed" in the path information corresponding to this path.

Furthermore, in cases where the external LDEV setting position information of a certain external LDEV is updated (YES in S39), the first memory control device 20 issues a reference command for the external LDEV via all of the paths in a normal state among one or more paths specified by one or more sets of path information contained in the external LDEV information of this external LDEV, receives reference data via the respective paths in response to this command, and acquires external LDEV setting information from the reference data position indicated by the external LDEV setting position information following updating.

The first memory control device 20 causes the acquired external LDEV identification information and/or external LDEV setting information to be included in the external device information corresponding to the external LDEV that is the reference destination (S41). Furthermore, the first memory control device 20 reflects the updated information in the corresponding object individual information (S42).

The processing described with reference to FIGS. 11 and 12 above can be performed even while the computer program in the first memory control device 20 (e.g., a microprogram read into the MPs of the CHAs 2A and 2B) is caused to operate "as is". Specifically, updating of the support device information can be performed while the computer program is operated "as is".

A concrete example of the abovementioned processing will be described with reference to FIGS. 10A, 13A, 13B and 14A through 14C.

Figure 13A:
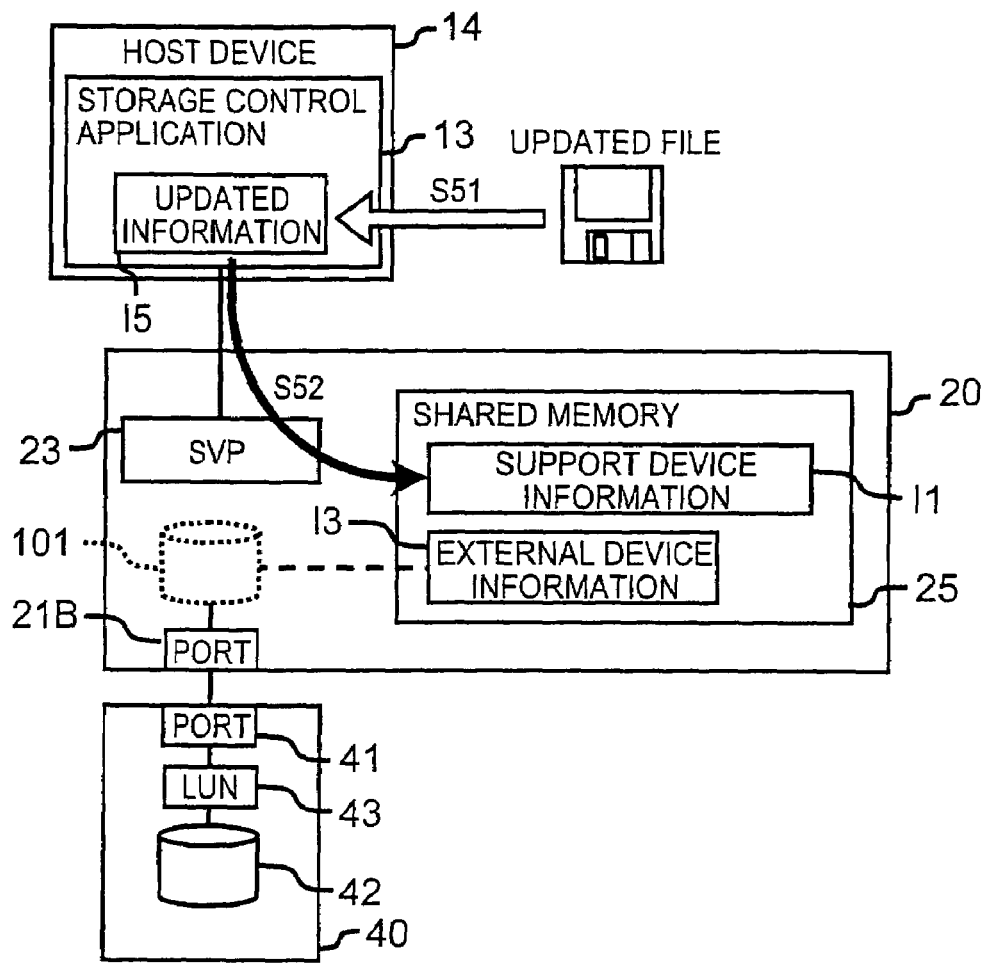
FIGS. 13A and 13B show the flow up to the point where the updated information that is read in by the storage control application is reflected in the support device information I1 of the first memory control device 20.
Figure 13B:
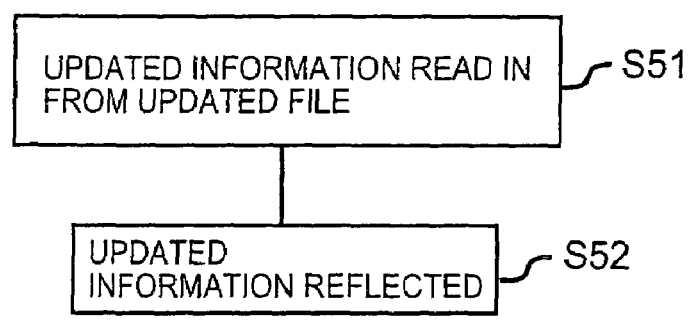

FIGS. 13A and 13B show the flow the flow up to the point where the updated information read in by the storage control application is reflected in the support device information I1 of the first memory control device 20. FIG. 14A shows an example of the construction of the reference data that is acquired in this concrete example. FIG. 14B shows an example of the construction of the second individual support device information I2 following updating. FIG. 14C shows an example of the construction of the external device information I3 that is produced using this second individual support device information I2.

In this concrete example, it is assumed that the external LDEV identification position information (among the second individual support device information I2) is updated to "D1 through D4". In other words, a case is considered in which "DEV1" is used as the external LDEV identification information instead of "LDEV1".

The storage control application 13 acquires updated information from the updated file using the "function of reading in of updated file information" (S51). This updated information is information that is used to update the external LDEV identification position information of the second individual support device information I2 from "C4 through C8" to "D1 through D4".

Using the function of "reflecting updated information in the shared memory", the storage control application 13 causes this updated information to be reflected in the shared memory 25. Consequently, the external LDEV identification position information is updated, and as a result of this, the second individual support device information is altered from the content shown in FIG. 7C to the content shown in FIG. 14B, and the content of the external device information corresponding to this individual information is altered from the content shown in FIG. 7D to the content shown in FIG. 14C. Subsequently, the reference data shown in FIG. 14A, the second individual support device information shown in FIG. 14B and the external device information shown in FIG. 14C are used in cases where the judgment processing shown in FIG. 8 is performed.

To describe this more concretely, "AAB" is acquired as model identification information from the reference data, and "LDEV1" is acquired as external LDEV identification information, by using the second individual support device information prior to updating in this concrete example. Furthermore, "AAB" is acquired as model identification information, and "LDEV1" is acquired as external LDEV identification information, from the external device information prior to updating. Accordingly, since sets of information of the same type agree with each other, the first memory control device 20 judges that the external LDEV that is the reference destination is the mapped external LDEV. Subsequently, the first memory control device 20 acquires external LDEV identification information suing the updated information. Since the external LDEV identification position information is "D1 through D4" in the updated information, the first memory control device 20 acquires the data element of "DEV1" from the reference data I4 shown in FIG. 14A. The first memory control device 20 sets this "DEV1" in the external LDEV identification information of the external device information, and also updates the external LDEV identification position information of the second individual support device information to "D1 through D4". As a result, the second individual support device information is updated from the content shown in FIG. 7C to the content shown in FIG. 14B, and the external device information is updated from the content shown in FIG. 7D to the content shown in FIG. 14C.

Following the reflection of the updated information, the model identification information "AAB" and the external LDEV identification information "DEV1" are acquired from the reference data by referring to the second individual support device information following updating in the judgment processing shown in FIG. 8, and the model identification information "AAB" and external LDEV identification information "DEV1" are acquired from the external device information following updating. Accordingly, a match is obtained in S25 in FIG. 8, so that judgment results indicating that the external LDEV is the mapped external LDEV are obtained.

The model identification information and external LDEV identification information of the reference data prior to updating are held in the external device information. Accordingly, in cases where the construction of the reference data is altered (e.g., in cases where the position of the external LDEV identification information changes to another position), there is a possibility that it will become impossible to acquire model identification information and external LDEV identification information from the reference data. Consequently, in the judgment processing shown in FIG. 8, in spite of the fact that the external LDEV that is the reference destination is actually the mapped external LDEV, it may become impossible to obtain judgment results indicating that this LEDV is the mapped LDEV.

In this second example, the first memory control device 20 acquires a plurality of sets of external LDEV identification information from the reference data when the external device information is prepared, and includes the acquired plurality of sets of external LDEV identification information in the external device information corresponding to the external LDEV that is the reference destination. Subsequently, if the first memory control device 20 can confirm that even one of the plurality of sets of external LDEV identification information contained in the external device information matches the external device identification information in the reference data, this external device is judged to be the mapped external device. In other words, by setting the external LDEV identification information that is used to judge the appropriateness of the external LDEV as a plurality of sets of information, it is possible to judge that the external LDEV that is the reference destination is the mapped external LDEV even if there is an alteration in the construction of this external LDEV.

The above has been a description with reference to FIGS. 15A through 15C.

FIG. 15A shows one example of the reference data following the alteration of the of the reference data shown in FIG. 7A. FIG. 15B shows an example of the construction of the second individual support device information in a second example. FIG. 15C shows an example of the construction of the external device information corresponding to the second individual support device information in FIG. 15B.

As is shown for example in FIG. 15B, first and second sets of external LDEV identification position information are included the second individual support device information. External device information such as that shown for example in FIG. 15C is prepared by using first and second sets of external LDEV identification information acquired from reference data positions indicated by the abovementioned sets of external LDEV identification position information.

It is assumed here that the construction of the reference data is subsequently altered. In concrete terms, for example, it is assumed that the position of the first external device identification information "LDEV1" is altered from the positions C1 through C4 shown for example in FIG. 7A to the positions B4 through B8 shown for example in FIG. 15A. In this case, in the judgment processing shown in FGI. 8, null data is acquired from the reference position indicated by the first external LDEV identification position information in the second individual support device information (according to FIGS. 15A and 15B); accordingly, a match is not obtained in the comparison of the respective sets of the first external LDEV identification information with each other.

However, in this judgment processing, the first memory control device 20 acquires data elements from reference data positions indicated by the position of the second external LDEV identification information, and compares the acquired data elements and the second external LDEV identification information in the external device information. In this comparison, according to FIGS. 15A through 15C, a match of the respective sets of the second external LDEV identification information is obtained; accordingly, even if the construction of the reference data for the external LDEV that is the reference destination changes from the construction shown in FIG. 7A to the construction shown in FIG. 15A, the first memory control device 20 can judge that this external LDEV is the mapped external LDEV.

Furthermore, in this second example, in cases where a match is obtained for both the model identification information and first external LDEV identification information, cases where a match is obtained for both the model identification information and the second external LDEV identification information, or cases where a match is obtained for the second external LDEV identification information, the first memory control device 20 can judge that the external LDEV that is the reference destination is the mapped external LDEV.

EXAMPLE 3

The third example is an example of a case in which the reference data for a certain external LDEV is altered by the replacement of the program of the of the second memory control device 40 (e.g., replacement of a micro-program that is read into the MP of a CHA not shown in the figures).

In this third example, it is assumed that the reference data used for the preparation of the of the external device information has the construction shown for example in FIG. 7A, that the individual support device information used has the construction shown for example in FIG. 7C, and that the external device information that is prepared has the construction shown for example in FIG. 7D. Furthermore, it is assumed that in the reference data for the second memory control device 40, the reference data of a certain external LDEV is altered from the construction shown for example in FIG. 7A to the construction shown for example in FIG. 16A by the replacement of the program of the second memory control device 40 (e.g., the replacement of a micro-program that is read into the MP of a CHA not shown in the figures).

In this third example, assuming that the judgment processing shown in FIG. 8 is performed, the external LDEV identification information acquired from the reference data I4 (see FIG. 16A) using the second individual support device information shown in FIG. 7C is "00000". Accordingly, since this differs from the external LDEV identification information "LDEV1" contained in the external device information I3 shown in FIG. 7D, a judgment result indicating that the reference destination is the mapped external LDEV is not obtained, and the external LDEV that is the reference destination cannot be used.

In order to restore the external LDEV that is the reference destination to a usable state, it is necessary to update the support device information to support device information that corresponds to the altered reference data, to acquire model identification information and external LDEV identification information from the updated data that is altered during this updating, and to re-construct the external device information as information corresponding to the support device information following updating.

Accordingly, the processing described below is performed in this third example. For example, this processing can be applied to S36 in FIG. 1.

Using the individual support device information prior to updating, the first memory control device 20 judges the appropriateness of the external LDEV. Here, in cases where the first memory control device 20 cannot judge that this external LDEV is the mapped external LDEV, the first memory control device 20 acquires path information from the external device information corresponding to the external LDEV that is the reference destination, and displays the acquired path information on (for example) the display screen of the host computer 14 (or 10). The first memory control device 20 causes the user to judge whether or not the external LDEV is the mapped external LDEV, and if affirmative judgment results are obtained, the first memory control device 20 gives instructions for the continuation of the updating processing. After instructions for the continuation of the updating processing are received, for example, if the processing from S37 on in FIG. 11 is completed, the first memory control device 20 can execute the updating of the support device information and the reconstruction of the external device information corresponding to the support device information following updating. As a result, the external LDEV in question can be used.

The flow of the processing up to the point where the external LDEV is restored to a usable state following the updating of the second individual support device information will be described with reference to FIGS. 16B and 16C. For example, the processing described below is performed by operations from the GUI screen displayed by the storage control application 13.

Using the reference data acquisition function, the storage control application 13 acquires reference data (see FIG. 16A) from the current external LDEV (S61). The storage control application 13 analyzes the obtained reference data (S62), and investigates whether or not there has been any alteration in the model identification information and/or external LDEV identification information. In the case of the present example, since there have been changes in the external LDEV identification information, the storage control application 13 displays the content of the reference data acquired in S61, and causes the user to investigate whether or not usable data elements are present as external LDEV identification information. In the present example, since usable data elements are present as the external LDEV identification information "DEV1" in the positions D1 through D4, the storage control application 13 alters the external LDEV identification position information of the second individual support device information from "C4 through C8" to "D1 through D4" in accordance with instructions from the user, and prepares new second individual support device information (i.e., updated information) containing "D1 through D4" as external LDEV identification position information using the editing function for the individual support device information (S63).

Using the function of "reflection of the updated information in the shared memory", the storage control application 13 causes the updated information to be reflected (S64). Since the external LDEV identification position information is updated, the first memory control device 20 acquires external LDEV identification information from the reference data using the updated information, updates the support device information using the updated information, and also updates the external device information using this updated information. In this case, since the first memory control device 20 performs updating in the processing shown in FIGS. 11 and 12, the processing of S36 can be omitted, reference data can be acquired using path information, and external LDEV identification information can be acquired.

In this third example, "DEV1" is acquired as the external LDEV identification information, the second individual support device information is updated from FIG. 7C to the content shown in FIG. 14B, and the external device information is updated from FIG. 7D to the content shown in FIG. 14C.

In cases where the judgment processing shown in FIG. 8 is thus performed after the updated information is reflected, "AAB" is acquired as model identification information, and "DEV1" is acquired as external LDEV identification information, from the reference data. Furthermore, "AAB" is acquired as model identification information, and "DEV1" is acquired as external LDEV identification information, from the external device information. Accordingly, the matching of information is obtained for both the model identification information and the external LDEV identification information. Consequently, since it is judged that the external LDEV that is the reference destination is the mapped external LDEV, the external LDEV that is the reference destination is restored to a usable state.

The above has been a description of several preferred examples of the present invention. However, these are merely examples that are used to illustrate the present invention, and the scope of the present invention is not limited to these examples alone. The present invention can also be worked in various other aspects. For instance, examples were described in which the format of the reference data was different for each model. However, this format may vary according to various types of memory control device attributes, e.g., vendor, maker or the like. In such cases, the individual support device information may be prepared for each of these various attributes, instead of each model. Furthermore, the input of the updated information can be performed via the third communications network CN3 from the host computer 14 (out-of-band), or can be performed via the first communications network CN1 from the host computer 10 (in-band). Furthermore, the reference destination may be the second memory control device 40, or may be individual LDEVs 42 disposed in this second memory control device 40. Moreover, all of the abovementioned plurality of examples may be used in an open system or in a main frame.

What is claimed is:

1. A control device which can be connected to a host computer that outputs access destination data indicating an access destination; and an external storage control device which has one or more external storage devices; and which transmits external data constituting data that relates to the external storage devices, comprising:

a memory part which stores external device information that indicates which external storage device is associated with which access destination data; and a control part which provides a storage device to said host computer based on a virtual device including at least an external storage device, receives access destination data indicating said storage device from said host computer, specifies the external storage device that corresponds to said received access destination data by referring to said external device information, and accesses said specified external storage device; wherein said memory part stores data format information relating to the format of said external data;

said external device information includes external storage device identification information that is used to identify said external storage device, and external storage device setting information including information that is set for a predetermined external storage device of said external storage control device;

said data format information includes external storage device identification position information indicating where said external storage device identification information is located in said external data, and external storage device setting position information indicating where the external storage device setting information is located in said external data;

said control part performs operations (A) and (B) of, (A) when receiving updated external storage device identification position information, re-acquires said external storage device identification information from said external data using, said updated external storage device identification position information, and resets said re-acquired external storage device identification information in said external device information, (B) when receiving updated external storage device setting position information, re-acquires said external storage device setting information from said external data using said updated external storage device setting position information, and resets said re-acquired external storage device setting information in said external device information.

2. The control device according to claim 1, wherein said data format information includes a plurality of sets of individual data format information, and each of said plurality of sets of individual data format information includes information elements including an information element indicating the device attributes of the external storage control device to which said information corresponds, said external storage device identification position information and said external storage device setting position information.

3. The control device according to claim 2, wherein said control part retrieves individual data format information corresponding to the device attributes of the external storage control device that transmitted said external data from said plurality of sets of individual data format information, and produces said external device information using the individual data format information that is found in said retrieval, and said received external data.

4. The control device according to claim 3, wherein said control part retrieves individual data format information corresponding to the device attributes of the external storage control device that transmitted said external data from said plurality of sets of individual data format information, and verifies a mapping status of the external storage device indicated in said external device information using the individual data format information that is found in said retrieval, external device information that is prepared using the individual data format information that is found in said retrieval, and said received external data.

5. The control device according to claim 3, wherein device attribute identification information that is used to identify the device attributes of said external storage control device and external storage device identification information that is used to identify said external storage device are contained in said external data, device attribute identification information that indicates device attributes corresponding to the individual data format information, attribute identification position information indicating the area in said external data where said device attribute identification information is located, and device identification position information indicating the area in said external data where said external storage device identification information is located, are contained in each of said plurality of sets of individual data format information, and said control part acquires device attribute identification information from the external data position indicated by said attribute identification position information in certain individual data format information, retrieves individual data format information that produces affirmative results indicating said acquired device attribute identification information and the device attribute identification information in said certain individual data format information match each other, acquires external storage device identification information from the external data position indicated by the device identification position information in the individual data format information found in said retrieval, and produces said external device information that includes said acquired external storage device identification information.

6. The control device according to claim 2, wherein said control part inputs updated information that expresses all or part of the content of a certain set of individual data format information following updating, verifies that said input updated information is reflected in the set of individual data format information that corresponds to this updated information, reflects said updated information in cases where it is recognized that predetermined conditions are met, and does not reflect said updated information in cases where it is not recognized that said predetermined conditions are met.

7. The control device according to claim 6, wherein each of said sets of individual data format information includes supported-function information that indicates which functions are either supported or not supported by the external storage control device that has device attributes corresponding to this set of individual data format information, and in cases where supported-function information indicating that a certain function is not supported is included in said input updated information, said control part acts so that said updated information is not reflected if said control device is using this certain function.

8. The control device according to claim 6, wherein said external device information is information that is produced using the set of individual data format information corresponding to the device attributes of the external storage control device that transmitted said external data, and said external data, and said control part verifies a mapping status of said external storage device is appropriate using the set of individual data format information prior to the reflection of said input updated information, and the external data relating to the external storage device corresponding to said external device information, and does not reflect said input updated information in cases where it is verified that said external storage device is not mapped.

9. The control device according to claim 2, wherein said external device information is information that is produced using the set of individual data format information corresponding to the device attributes of the external storage control device that transmitted said external data, and said external data, predetermined types of information elements are included in either said external device information or said sets of individual data format information, or both, and in said external data, said control part verifies a mapping status of the external storage device indicated in said external device information using said predetermined types of information elements that are respectively included in either said external device information or said sets of individual data format information, or both, and in said external data, and two or more of said predetermined types of information elements are included in either said external device information or said sets of individual data format information, or both, and in said external data.

10. The control device according to claim 2, wherein said external device information is information that is produced using the set of individual data format information corresponding to the device attributes of the external storage control device that transmitted the external data, and said external data, said control part inputs updated information that expresses all or part of the content of a certain set of individual data format information following updating, reflects said input updated information in the set of individual data format information that corresponds to this updated information, and verifies a mapping status of said external storage device using the set of individual data format information in which said updated information is reflected, external device information produced using this set of individual data format information, and external data relating to the external storage device indicated by this external device information, and in cases where verification indicating that the external storage device is not mapped is obtained, said external device information is produced using the set of individual data format information in which said updated information is reflected, and said external data.

* * * * *